United States Patent
Oto

(10) Patent No.: US 9,976,903 B2
(45) Date of Patent: May 22, 2018

(54) SPECTROMETER AND METHOD OF SPECTROSCOPY

(71) Applicant: Fuji Electric Co., Ltd., Kanagawa (JP)

(72) Inventor: Masanori Oto, Kanagawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days. days.

(21) Appl. No.: 15/293,219

(22) Filed: Oct. 13, 2016

(65) Prior Publication Data

US 2017/0131146 A1    May 11, 2017

(30) Foreign Application Priority Data

Nov. 11, 2015  (JP) .................................. 2015-220987
Jan. 8, 2016  (JP) .................................. 2016-002288

(51) Int. Cl.
| | |
|---|---|
| G01J 3/45 | (2006.01) |
| G01B 9/02 | (2006.01) |
| G01J 3/453 | (2006.01) |
| G01J 3/447 | (2006.01) |
| G01J 3/02 | (2006.01) |

(52) U.S. Cl.
CPC ............. G01J 3/453 (2013.01); G01J 3/0224 (2013.01); G01J 3/447 (2013.01)

(58) Field of Classification Search
CPC ........ G01J 3/0208; G01J 3/0224; G01J 3/447; G01J 3/45; G01J 3/453; G01J 3/4531; G01J 3/4532
See application file for complete search history.

(56) References Cited

U.S. PATENT DOCUMENTS

| | | | | |
|---|---|---|---|---|
| 4,320,973 A * | 3/1982 | Fortunato | ............... | G01J 3/453 356/453 |
| 5,781,293 A * | 7/1998 | Padgett | .................... | G01J 3/447 356/453 |
| 2005/0237532 A1* | 10/2005 | Beale | .................... | G01J 3/2823 356/453 |
| 2012/0268745 A1* | 10/2012 | Kudenov | ................ | G01J 3/447 356/453 |
| 2017/0010159 A1* | 1/2017 | Jin et al. | .................. | G01J 3/447 |

FOREIGN PATENT DOCUMENTS

| | | |
|---|---|---|
| JP | H2-268234 A | 11/1990 |
| JP | 2002-168696 A | 6/2002 |
| WO | WO 2011093794 A1 * | 8/2011 ............ G01J 3/2823 |

\* cited by examiner

*Primary Examiner* — Michael A Lyons
(74) *Attorney, Agent, or Firm* — Chen Yoshimura LLP

(57) ABSTRACT

A spectrometer includes a beam splitter that receives incident light rays and splits each of the incident light rays into first and second spatially displaced, linearly polarized light rays that respectively have first and second polarization directions orthogonal to each other; an optical member that receives the split incident light rays from the beam splitter and optically converts the split incident light rays into a plurality of light beams that are respectively guided to mutually differing locations so as to generate interference fringes in the respective locations, each of the plurality of light beams including a component of the first linearly polarized light rays and a component of the second linearly polarized light rays; and a detector that detects the interference fringes respectively generated by the plurality of light beams.

11 Claims, 15 Drawing Sheets

SPECTROMETER AND METHOD OF SPECTROSCOPY

BACKGROUND OF THE INVENTION

Technical Field

The present invention relates to a spectrometer and a method of spectroscopy, and more particularly to Fourier transform spectroscopy.

Background Art

In one method of Fourier transform spectroscopy, a light ray from a light source is split into two light rays using a beam splitter, and then these two light rays are made to interfere with one another.

Patent Document 1 discloses an example of a spectrometer used for Fourier transform spectroscopy. In Patent Document 1, a Wollaston prism is used as the beam splitter. A Wollaston prism splits a light ray from a light source into an ordinary light ray and an extraordinary light ray. The ordinary light ray and the extraordinary light ray then interfere with one another on a detector.

Patent Document 2 also discloses an example of a spectrometer used for Fourier transform spectroscopy. In Patent Document 2, a Savart plate is used as the beam splitter. A Savart plate also splits a light ray from a light source into an ordinary light ray and an extraordinary light ray. The ordinary light ray and the extraordinary light ray are then focused onto a detector using a single lens. In this way, the ordinary light ray and the extraordinary light ray interfere with one another.

Furthermore, in Patent Document 2, a polarizer is arranged between the Savart plate and the lens. The detector detects an interference fringe (a first interference fringe) created by the light beams that pass through the polarizer. In Patent Document 2, after this interference fringe is detected, the orientation of the transmission axis of the polarizer is changed. The detector then detects the new interference fringe (a second interference fringe) created by the light beams that pass through the polarizer. In Patent Document 2, the difference between the first interference fringe and the second interference fringe is then calculated. Patent Document 2 discloses that calculating this difference removes background noise.

RELATED ART DOCUMENTS

Patent Documents

Patent Document 1: Japanese Patent Application Laid-Open Publication No. 2002-168696

Patent Document 2: Japanese Patent Application Laid-Open Publication No. H2-268234

SUMMARY OF THE INVENTION

In Fourier transform spectroscopy, an interference fringe is detected by a detector, and then a Fourier transform is applied to this interference fringe. However, sometimes the interference fringe is not detected correctly due to pixel defects in the detector (such as a charge-coupled device (CCD) image sensor), for example.

The present invention was made in light of the foregoing and aims to prevent any negative effects caused by a region of an interference fringe being detected incorrectly when using Fourier transform spectroscopy. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a spectrometer, including: a beam splitter that receives incident light rays and splits each of the incident light rays into first and second spatially displaced, linearly polarized light rays that respectively have first and second polarization directions orthogonal to each other; an optical member that receives the split incident light rays from the beam splitter and optically converts the split incident light rays into a plurality of light beams that are respectively guided to mutually differing locations so as to generate interference fringes in the respective locations, each of the plurality of light beams including a component of the first linearly polarized light rays and a component of the second linearly polarized light rays; and a detector that detects the interference fringes respectively generated by the plurality of light beams.

In another aspect, the present disclosure provides a spectrometer, including: a beam splitter that receives incident light rays and splits each of the incident light rays into first and second spatially displaced, linearly polarized light rays that respectively have first and second polarization directions orthogonal to each other; an optical member that receives the split incident light rays from the beam splitter and optically converts the split incident light rays into a plurality of light beams that are respectively guided to mutually differing locations on a virtual plane so as to generate interference fringes in the respective locations in the virtual plane, each of the plurality of light beams including a component of the first linearly polarized light rays and a component of the second linearly polarized light rays; a two-dimensional detector that detects the interference fringes respectively generated by the plurality of light beams on the virtual plane; and a signal processor that applies a Fourier transform to data representing the interference fringes detected by the detector or applies a Fourier transform to data obtained by processing the data representing the interference fringes detected by the detector.

In another aspect, the present disclosure provides a method of spectroscopy, including: receiving incident light rays and splitting each of the incident light rays into first and second spatially displaced, linearly polarized light rays that respectively have first and second polarization directions orthogonal to each other using a beam splitter; by the optical member, receiving the split incident light rays from the beam splitter and optically converting the split incident light rays into a plurality of light beams that are respectively guided to mutually differing locations so as to generate interference fringes in the respective locations, each of the plurality of light beams including a component of the first linearly polarized light rays and a component of the second linearly polarized light rays; and detecting the interference fringes respectively generated by the plurality of light beams using a detector.

The present invention makes it possible to prevent any negative effects caused by a region of an interference fringe being detected incorrectly when using Fourier transform spectroscopy.

It is to be understood that both the foregoing general description and the following detailed description are exemplary and explanatory, and are intended to provide further explanation of the invention as claimed.

BRIEF DESCRIPTION OF THE DRAWINGS

FIG. 4A is a side view of the spectrometer, and FIG. 4B is a top view of the spectrometer.

FIG. 7A is a side view of the spectrometer, and FIG. 7B is a top view of the spectrometer.

FIG. 8A is a side view of the spectrometer, and FIG. 8B is a top view of the spectrometer.

FIG. 11A is a side view of the spectrometer, and FIG. 11B is a top view of the spectrometer.

FIG. 14A is a side view of the spectrometer, and FIG. 14B is a top view of the spectrometer.

FIGS. 15A and 14B illustrate Modification Example 2 of FIGS. 12A and 12B. FIG. 15A is a side view of the spectrometer.

DETAILED DESCRIPTION OF EMBODIMENTS

Figure 1A:
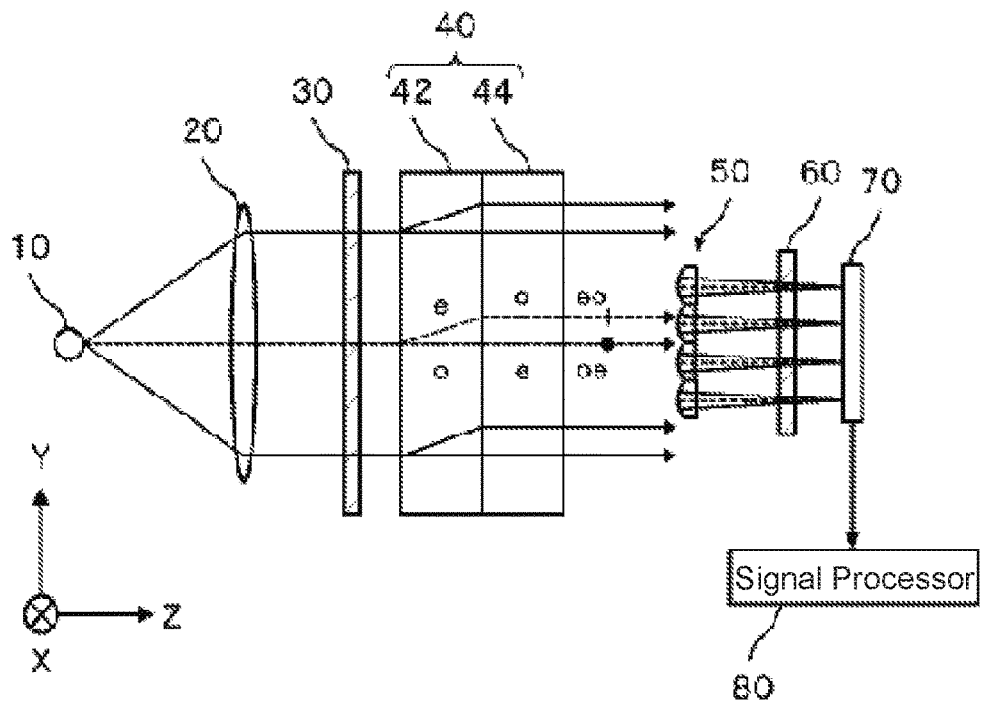
FIG. 1A is a side view illustrating a configuration of a spectrometer according to Embodiment 1.

Next, embodiments of the present invention will be described with reference to figures. Note that the same reference characters are used in all of the figures for components that are the same, and redundant descriptions of these components will be omitted as appropriate.

Moreover, in the following descriptions, a signal processor 80 is intended to be a functional block rather than a specific hardware component. The signal processor 80 may implemented using any combination of hardware and software, such as primarily any computer CPU, memory, programs implemented according to the configurations illustrated in the figures that are loaded into the memory, storage media such as a hard disk for storing the programs, and an interface for connecting to a network. Furthermore, the methods and devices used to implement the signal processor 80 may be modified in various ways.

Embodiment 1

Figure 1B:
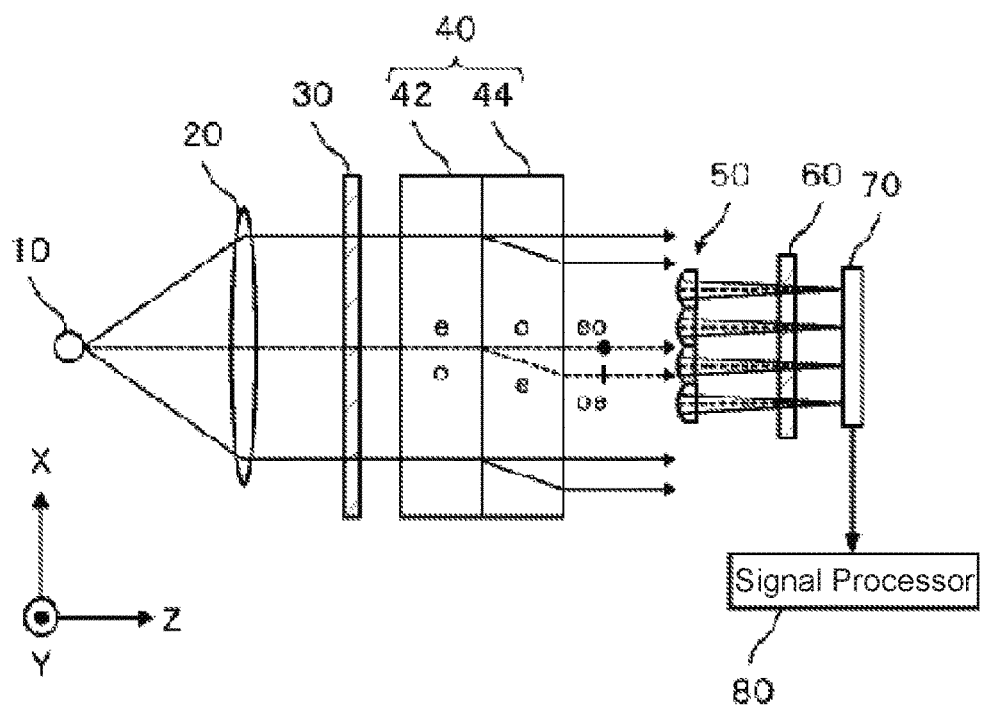
FIG. 1B is a top view illustrating the configuration of the spectrometer according to Embodiment 1.

FIG. 1A is a side view illustrating a configuration of a spectrometer according to Embodiment 1. FIG. 1B is a top view illustrating the configuration of the spectrometer according to the present embodiment. The spectrometer includes a beam splitter 40, a fly's-eye lens 50 (an optical member), and a detector 70. The beam splitter 40 splits each of incident light rays from a light source 10 into an ordinary light ray (first linearly polarized light rays) eo and an extraordinary light ray (second linearly polarized light rays) oe. The fly's-eye lens 50 optically converts light rays that includes the ordinary light rays eo and the extraordinary light rays oe into a plurality of light beams. Each light beam of this plurality of light beams includes an ordinary light ray eo component and an extraordinary light ray oe component. The fly's-eye lens 50 focuses the plurality of light beams onto mutually differing regions. The detector 70 detects the interference fringes respectively created by the plurality of light beams. The details of this will be described below.

The light source 10 emits incident light that is to be measured by the spectrometer. This light may be light that passed through a sample, light that was scattered by a sample, or light that was emitted by a sample, for example. In addition, this light may be infrared light, for example, or may alternatively be visible light or ultraviolet light.

The light from the light source 10 passes through a lens 20. The lens 20 converts the light from the light source 10 to collimated light. In other words, the lens 20 is a collimating lens.

The light from the lens 20 enters a polarizer 30. In the example illustrated in FIGS. 1A and 1B, the polarizer 30 is arranged such that the transmission axis of the polarizer 30 is inclined by an angle of 45° towards one of the sides going from the height direction of the spectrometer (the Y direction in the figure) towards the width direction of the spectrometer (the X direction in the figure). Therefore, light that passes through the polarizer 30 oscillates in the same direction as the transmission axis of the polarizer 30.

The linearly polarized light (incident light rays) from the polarizer 30 enters the beam splitter 40. These incident light rays exit the beam splitter 40 as ordinary light rays eo and an extraordinary light rays oe. In the example illustrated in FIGS. 1A and 1B, the optical axes of the ordinary light ray eo and the extraordinary light ray oe are parallel to one another and extend along the thickness direction of the beam splitter 40 (the Z direction in the figure). The ordinary light ray eo and the extraordinary light ray oe are both linearly polarized light rays. The direction of oscillation of the ordinary light ray eo and the direction of oscillation of the extraordinary light ray oe are mutually orthogonal. More specifically, the ordinary light ray eo oscillates in the height direction of the spectrometer (the Y direction in the figure), and the extraordinary light ray oe oscillates in the width direction of the spectrometer (the X direction in the figure).

Figure 2:
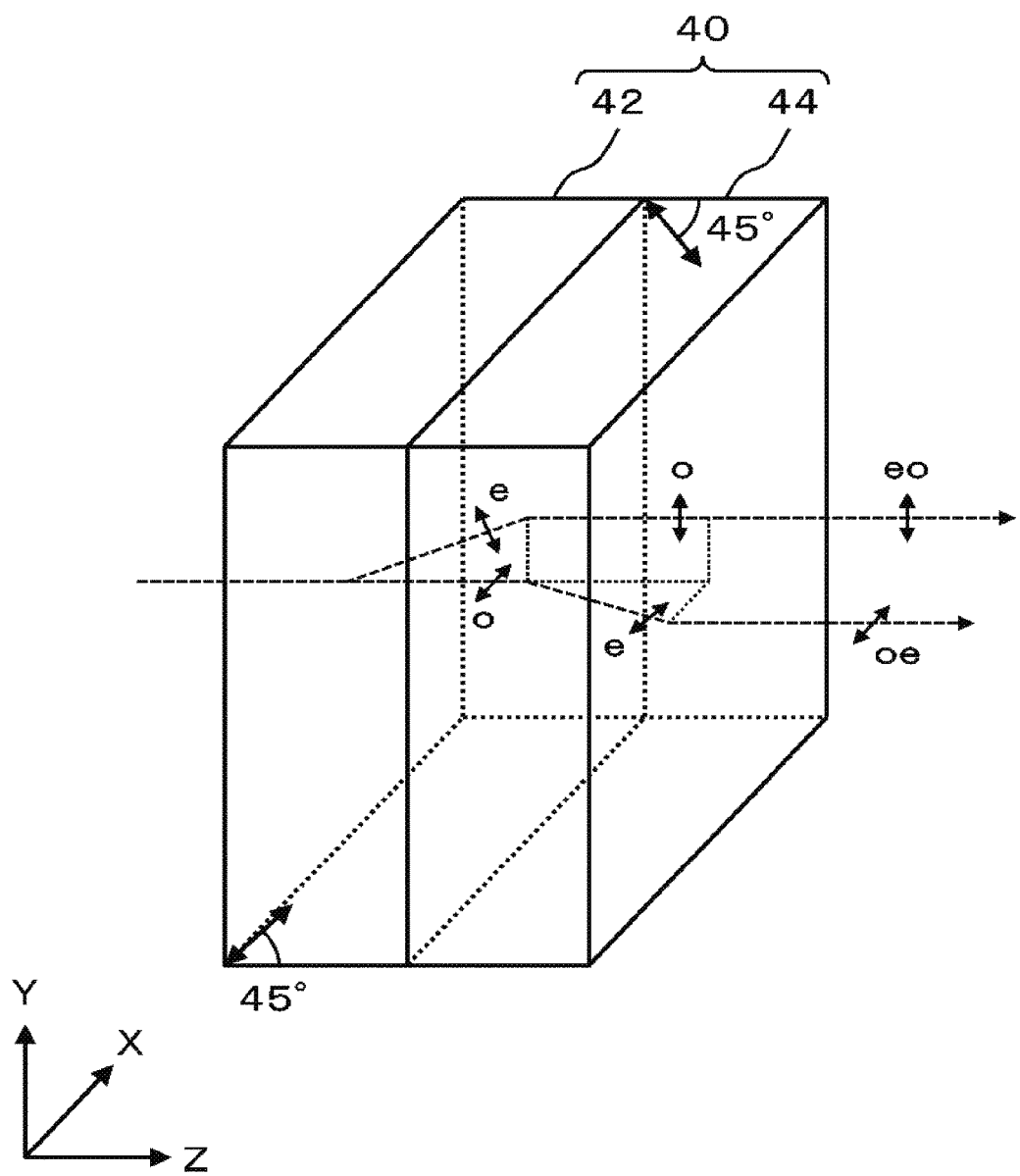
FIG. 2 is a detailed view of a beam splitter illustrated in FIGS. 1A and 1B.

FIG. 2 is a detailed view of the beam splitter illustrated in FIGS. 1A and 1B. In the example illustrated in FIG. 2, the beam splitter 40 is a Savart plate. The beam splitter 40 includes a first crystal plate 42 and a second crystal plate 44. The first crystal plate 42 and the second crystal plate 44 are bonded to one another.

The first crystal plate 42 and the second crystal plate 44 are both made from a uniaxial crystal. The first crystal plate 42 is made from the same material as the second crystal plate 44. Moreover, the thickness of the first crystal plate 42 is equal to the thickness of the second crystal plate 44. In the example illustrated in FIG. 2, the first crystal plate 42 and the second crystal plate 44 are made from yttrium vanadate ($YVO_4$). However, the first crystal plate 42 and the second crystal plate 44 may alternatively be made from calcite ($CaCO_3$), quartz ($SiO_2$), or titanium oxide ($TiO_2$), or from liquid crystal, a birefringent polymer, or a glass made optically anisotropic by poling, for example.

The first crystal plate 42 is formed such that the optic axis thereof is inclined by 45° from the thickness direction of the first crystal plate 42 (the Z direction in the figure). Similarly, the second crystal plate 44 is formed such that the optic axis thereof is inclined by 45° from the thickness direction of the second crystal plate 44 (the Z direction in the figure). The first crystal plate 42 and the second crystal plate 44 are bonded together such that the optic axis of the first crystal plate 42 and the optic axis of the second crystal plate 44 are mutually orthogonal when the beam splitter 40 (the first crystal plate 42 and the second crystal plate 44) is viewed from the thickness direction (the Z direction in the figure). In the example illustrated in FIG. 2, the optic axis of the first crystal plate 42 is inclined upwards moving towards the second crystal plate 44 side. The optic axis of the second crystal plate 44 is inclined rightwards moving towards the side opposite to the first crystal plate 42.

The light that enters the first crystal plate 42 is split into an extraordinary light ray e (a first extraordinary light ray e) and an ordinary light ray o (a first ordinary light ray o) by the entrance surface of the first crystal plate 42. The first extraordinary light ray e is refracted by the entrance surface of the first crystal plate 42. The optical axis of the first extraordinary light ray e is inclined in the same direction from the thickness direction of the first crystal plate 42 (the Z direction in the figure) as the optic axis of the first crystal plate 42. The first extraordinary light ray e is linearly polarized light. The first extraordinary light ray e oscillates in a direction parallel to the optic axis of the first crystal plate 42. Meanwhile, the first ordinary light ray o is not refracted by the entrance surface of the first crystal plate 42 and proceeds straight along the thickness direction of the first crystal plate 42 (the Z direction in the figure). The first ordinary light ray o is linearly polarized light. The first ordinary light ray o oscillates in a direction orthogonal to the optic axis of the first crystal plate 42.

The extraordinary light ray e from the first crystal plate 42 enters the second crystal plate 44 and becomes an ordinary light ray o (a second ordinary light ray o). The second ordinary light ray o proceeds straight along the thickness direction of the second crystal plate 44 (the Z direction in the figure). The second ordinary light ray o is linearly polarized light. The second ordinary light ray o oscillates in a direction orthogonal to the optic axis of the second crystal plate 44. Meanwhile, the ordinary light ray o from the first crystal plate 42 enters the second crystal plate 44 and becomes an extraordinary light ray e (a second extraordinary light ray e). The second extraordinary light ray e is refracted by the interface between the first crystal plate 42 and the second crystal plate 44. The optical axis of the second extraordinary light ray e is inclined in the same direction from the thickness direction of the second crystal plate 44 (the Z direction in the figure) as the optic axis of the second crystal plate 44. The second extraordinary light ray e is linearly polarized light. The second extraordinary light ray e oscillates in a direction parallel to the optic axis of the second crystal plate 44.

The ordinary light ray o from the second crystal plate 44 is not refracted by the exit surface of the second crystal plate 44 and exits the second crystal plate 44 as the ordinary light ray eo. The ordinary light ray eo proceeds straight along the thickness direction of the beam splitter 40 (the Z direction in the figure). Meanwhile, the extraordinary light ray e from the second crystal plate 44 is refracted by the exit surface of the second crystal plate 44. As a result, the extraordinary light ray e from the second crystal plate 44 exits the second crystal plate 44 as the extraordinary light ray oe. The extraordinary light ray oe proceeds straight along the thickness direction of the beam splitter 40 (the Z direction in the figure).

Alternatively, the beam splitter 40 may be a Wollaston prism. The following description assumes that the beam splitter 40 is a Savart plate.

Return to FIGS. 1A and 1B. The ordinary light ray eo and the extraordinary light ray oe enter the fly's-eye lens 50. The fly's-eye lens 50 includes a plurality of lenses that are arranged in a two-dimensional array when viewed from the direction running parallel to the optical axis of the light (the ordinary light ray eo and the extraordinary light ray oe) that enters the fly's-eye lens 50 (the Z direction in the figure). This plurality of lenses is arranged within a plane orthogonal to the optical axis of the light (the ordinary light ray eo and the extraordinary light ray oe) that enters the fly's-eye lens 50. More specifically, the plurality of lenses is arranged in a 4×4 array.

When viewed from the direction running parallel to the optical axis of the light (the ordinary light ray eo and the extraordinary light ray oe) that enters the fly's-eye lens 50 (the Z direction in the figure), each of the lenses in the fly's-eye lens 50 is positioned within the spot of the ordinary light ray eo and the spot of the extraordinary light ray oe. Therefore, the ordinary light ray eo and the extraordinary light ray oe enter all of the lenses in the fly's-eye lens 50. As the ordinary light ray eo and the extraordinary light ray oe pass through the lenses in the fly's-eye lens 50, the ordinary light ray eo and the extraordinary light ray oe are split into a plurality of light beams. Each of these light beams includes an ordinary light ray eo component and an extraordinary light ray oe component.

The plurality of light beams from the fly's-eye lens 50 then pass through a polarizer 60. The polarizer 60 is arranged such that the transmission axis of the polarizer 60 is oriented in the same direction as the transmission axis of the polarizer 30. More specifically, the transmission axis of the polarizer 60 is inclined by an angle of 45° towards one of the sides going from the height direction of the spectrometer (the Y direction in the figure) towards the width direction of the spectrometer (the X direction in the figure). As a result, the light that passes through the polarizer 60 oscillates in the same direction as the transmission axis of the polarizer 60. Alternatively, the transmission axis of the polarizer 60 may be oriented in a different direction than the transmission axis of the polarizer 30. For example, the transmission axis of the polarizer 60 may be orthogonal to the transmission axis of the polarizer 30 when viewed from the direction running parallel to the optical axis of the light that passes through the polarizer 30 and the polarizer 60 (the Z direction in the figure).

Each of the light beams that passes through the polarizer 60 creates an interference fringe on the detector 70. More specifically, these interference fringes are created due to interference between the ordinary light ray eo component and the extraordinary light ray oe component included in each light beam. The detector 70 detects these interference fringes. More specifically, in the example illustrated in FIGS. 1A and 1B, the detector 70 is an image sensor that includes a plurality of photoelectric conversion elements arranged in a matrix. Even more specifically, the detector 70 is a charge-coupled device (CCD) image sensor.

Figure 3:
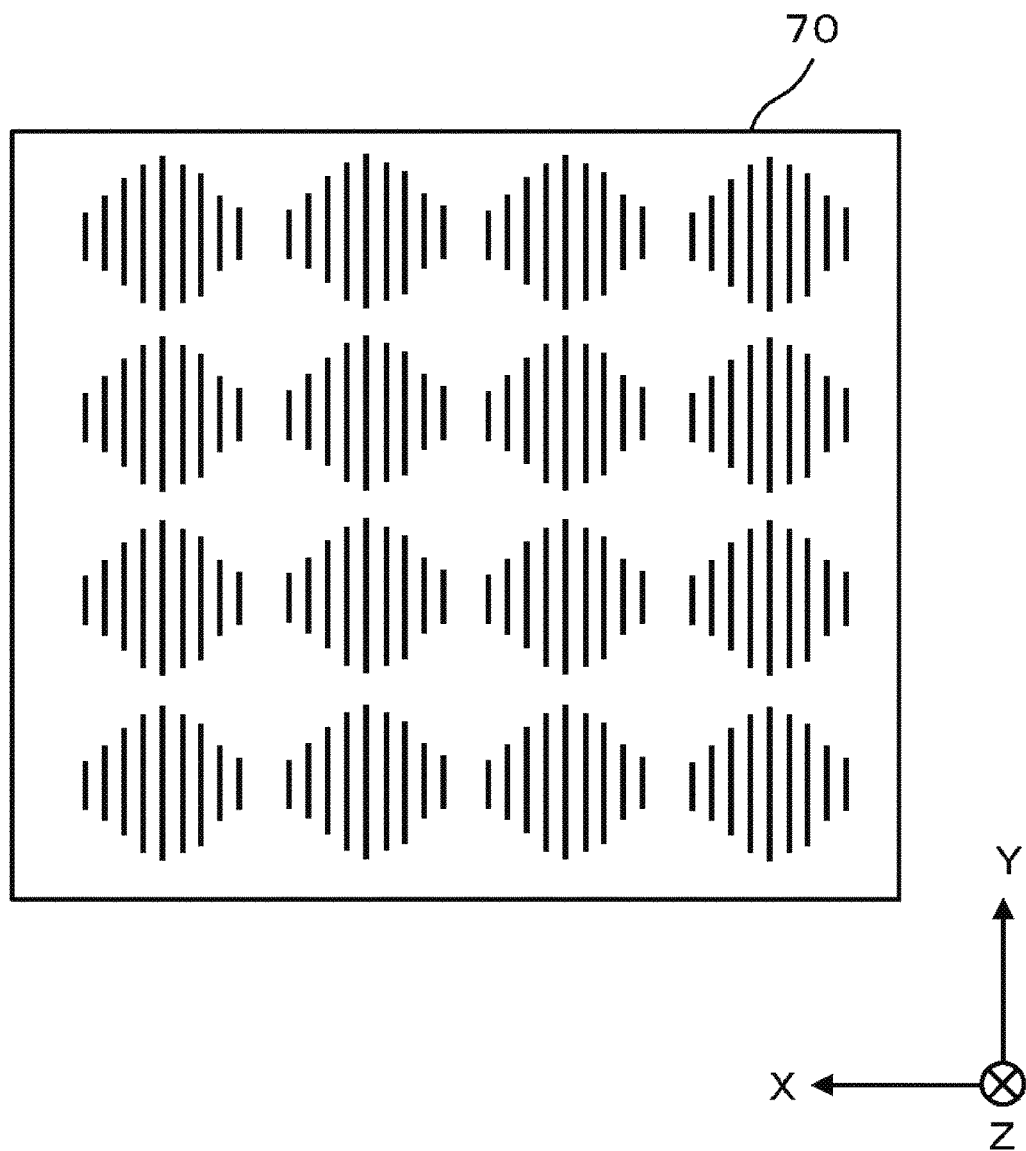
FIG. 3 illustrates an example of a plurality of interference fringes created by the spectrometer illustrated in FIGS. 1A and 1B.

FIG. 3 illustrates an example of the plurality of interference fringes created by the spectrometer illustrated in FIGS. 1A and 1B. In the example illustrated in FIG. 3, the plurality of interference fringes are shown as viewed from the front side of the detector 70. As described with reference to FIGS. 1A and 1B, the fly's-eye lens 50 includes a plurality of lenses arranged in a 4×4 array. As a result, like the plurality of lenses in the fly's-eye lens 50, the plurality of interference fringes are arranged in a 4×4 matrix pattern.

Return to FIGS. 1A and 1B. The plurality of interference fringes detected by the detector 70 are processed by a signal processor 80. More specifically, the signal processor 80 calculates the average of the plurality of interference fringes. The signal processor 80 then applies a Fourier transform to the data that represents that average (interference fringe). This makes it possible to obtain the spectrum of the light from the light source 10. In this case, even if some of the interference fringes are detected incorrectly due to pixel defects in the detector 70, for example, using this data that represents the average (interference fringe) makes it possible to prevent any negative effects due to such incorrect detections. Moreover, the signal processor 80 does not need to process all of the interference fringes detected by the detector 70 and may just process at least two of the interference fringes detected by the detector 70.

Figure 4A:
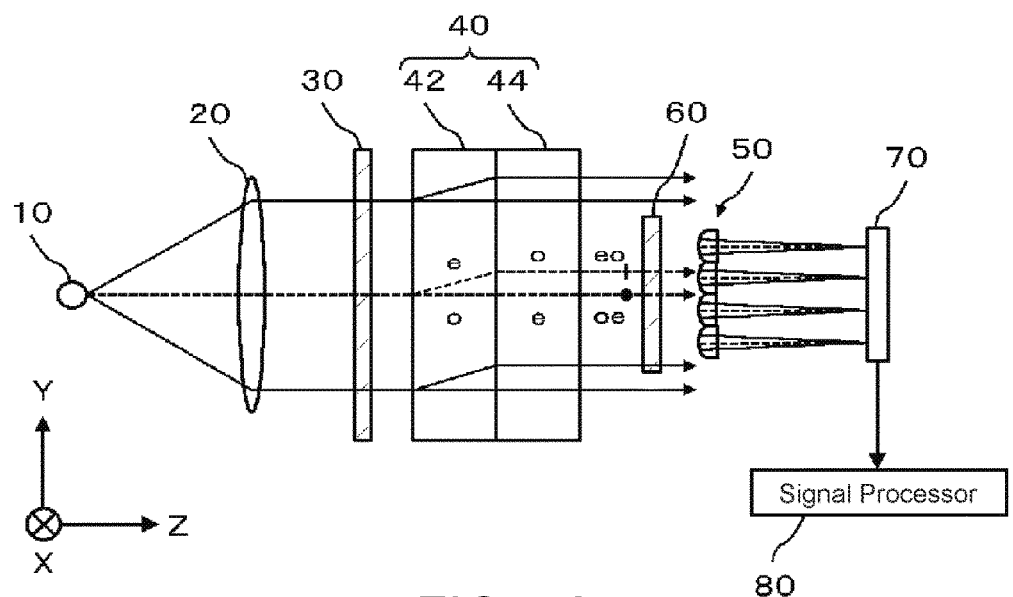
FIGS. 4A and 4B illustrate a modification example of FIGS. 1A and 1B.
Figure 4B:
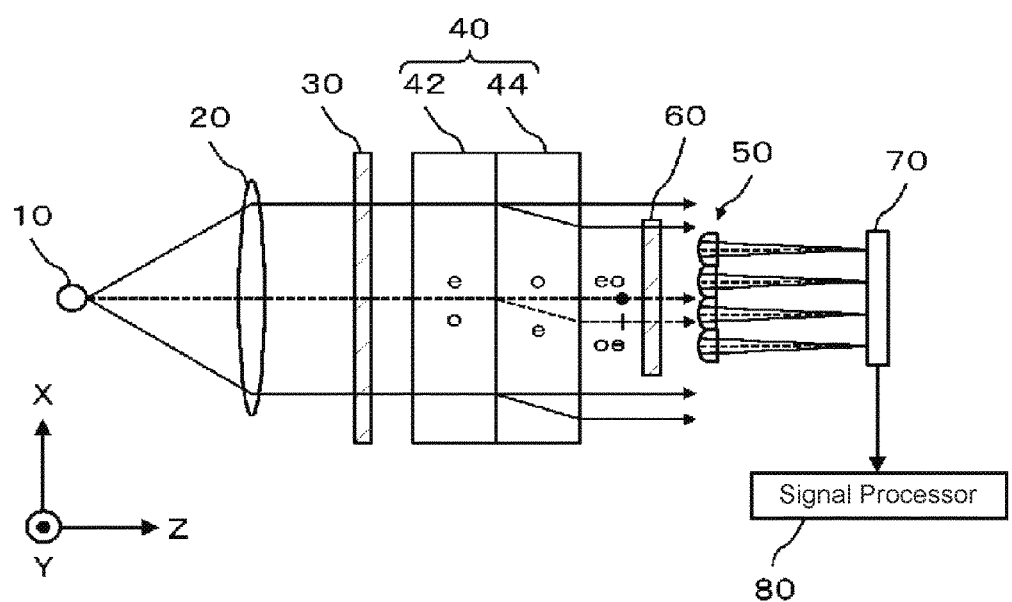

FIGS. 4A and 4B illustrate a modification example of FIGS. 1A and 1B. FIG. 4A is a side view of the spectrometer, and FIG. 4B is a top view of the spectrometer. As illustrated in FIGS. 4A and 4B, the polarizer 60 may be arranged between the beam splitter 40 and the fly's-eye lens 50. In this case, after passing through the polarizer 60, the ordinary light ray eo and the extraordinary light ray oe both oscillate in the same direction as the transmission axis of the polarizer 60. The light rays from the polarizer 60 are then split into a plurality of light beams by the fly's-eye lens 50. In the example illustrated in FIGS. 4A and 4B, interference fringes are created on the detector 70 due to interference between the ordinary light ray eo component and the extraordinary light ray oe component contained in each of these light beams.

In the present embodiment as described above, the fly's-eye lens 50 makes it possible to create a plurality of interference fringes. This makes it possible for the signal processor 80 to calculate the average of this plurality of interference fringes. In this case, even if some of the interference fringes are detected incorrectly due to pixel defects in the detector 70, for example, using the average described above makes it possible to prevent any negative effects due to such incorrect detections.

Embodiment 2

Figure 5A:
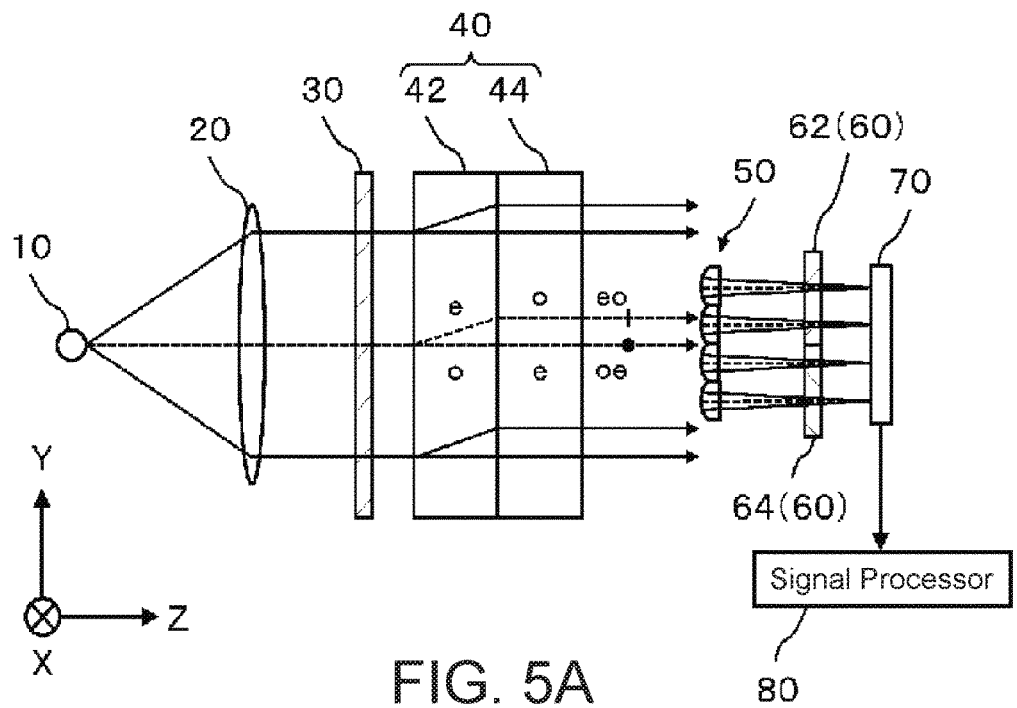
FIG. 5A is a side view illustrating a configuration of a spectrometer according to Embodiment 2.
Figure 5B:
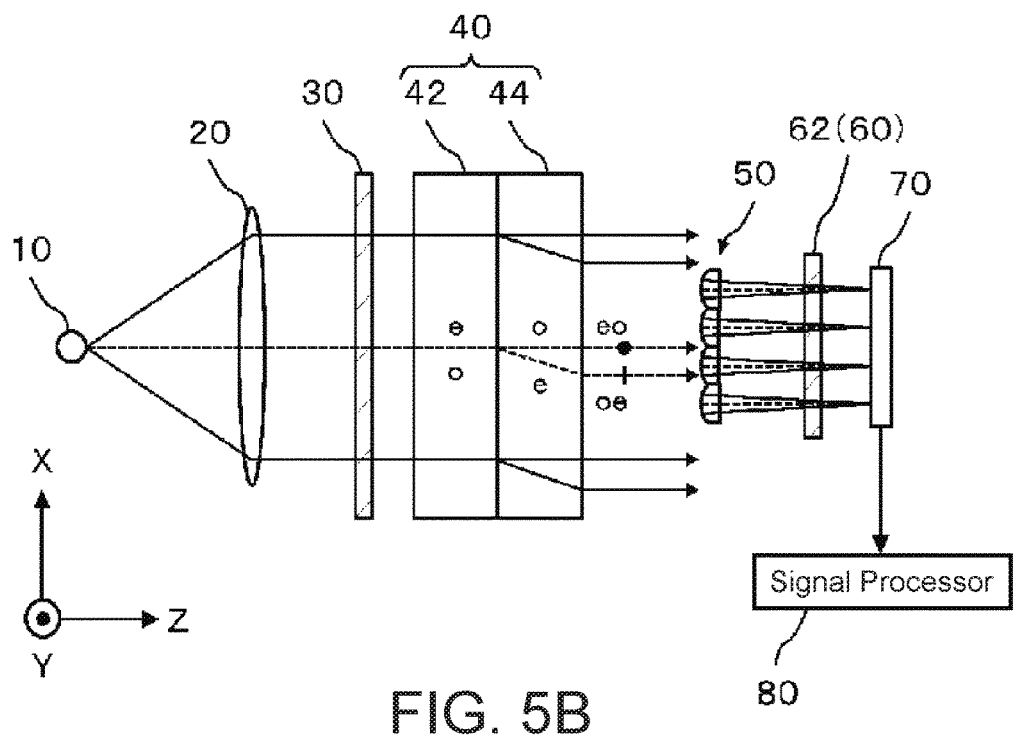
FIG. 5B is a top view illustrating the configuration of the spectrometer according to Embodiment 2.

FIG. 5A is a side view illustrating a configuration of a spectrometer according to Embodiment 2 and corresponds to FIG. 1A in Embodiment 1. FIG. 5B is a top view illustrating the configuration of the spectrometer according to the present embodiment and corresponds to FIG. 1B in Embodiment 1. The spectrometer according to the present embodiment has the same configuration as the spectrometer according to Embodiment 1 except for the following points.

In the example illustrated in FIGS. 5A and 5B, a first polarizer 62 and a second polarizer 64 are arranged between a fly's-eye lens 50 and a detector 70. Furthermore, in the example illustrated in FIGS. 5A and 5B, the first polarizer 62 and the second polarizer 64 are aligned with one another in the direction going from the fly's-eye lens 50 towards the detector 70 (the Z direction in the figure). The transmission axis of the first polarizer 62 and the transmission axis of the second polarizer 64 are oriented in different directions. More specifically, the transmission axes of the first polarizer 62 and the second polarizer 64 are mutually orthogonal when viewed from the direction running parallel to the optical axis of the light that passes through first polarizer 62 and the second polarizer 64 (the Z direction in the figure). Even more specifically, the transmission axis of the first polarizer 62 is inclined by an angle of 45° towards one of the sides going from the height direction of the spectrometer (the Y direction in the figure) towards the width direction of the spectrometer (the X direction in the figure), and the transmission axis of the second polarizer 64 is inclined by an angle of 45° towards the other of the sides going from the height direction of the spectrometer (the Y direction in the figure) towards the width direction of the spectrometer (the X direction in the figure).

Some of the light beams that exit from the fly's-eye lens 50 enter the first polarizer 62. The rest of the light beams that exit from the fly's-eye lens 50 enter the first polarizer 64. More specifically, in the example illustrated in FIGS. 5A and 5B, when viewed from the direction running parallel to the optical axis of the light beams that enter the fly's-eye lens 50 (the Z direction in the figure), the fly's-eye lens 50 includes a plurality of first lenses arranged in two rows running in the width direction of the spectrometer (the X direction in the figure) and a plurality of second lenses arranged beneath the plurality of first lenses and also in two rows running in the width direction of the spectrometer (the X direction in the figure). The light beams that enter the first polarizer 62 are the light beams that exit from the first lenses of the fly's-eye lens 50. The light beams that enter the second polarizer 64 are the light beams that exit from the second lenses of the fly's-eye lens 50.

Figure 6:
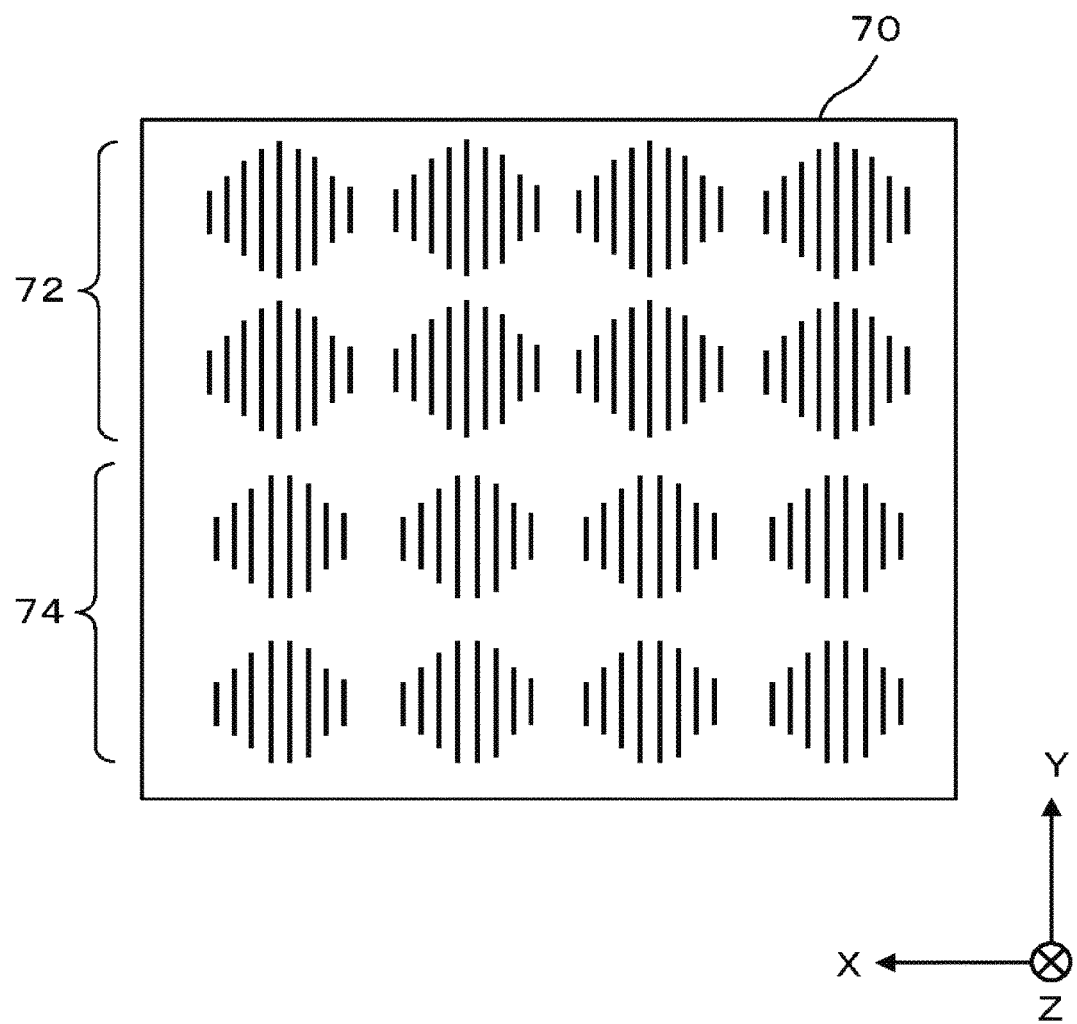
FIG. 6 illustrates an example of a plurality of interference fringes created by the spectrometer illustrated in FIGS. 5A and 5B.

FIG. 6 illustrates an example of a plurality of interference fringes created by the spectrometer illustrated in FIGS. 5A and 5B and corresponds to FIG. 3 in Embodiment 1. In the example illustrated in FIG. 6, the plurality of interference fringes are shown as viewed from the front side of the detector 70. Like the plurality of lenses in the fly's-eye lens 50, the plurality of interference fringes are arranged in a 4×4 matrix pattern. Furthermore, the interference fringes in the top two rows (the interference fringes in region 72 in the figure) are interference fringes (first interference fringes) created by the light beams that passed through the first polarizer 62. Meanwhile, the interference fringes in the bottom two rows (the interference fringes in region 74 in the figure) are interference fringes (second interference fringes) created by the light beams that passed through the second polarizer 64. Moreover, as illustrated in FIG. 6, when the interference fringes in the region 72 and the interference fringes in the region 74 are overlaid on top of one another, the bright areas of one group of interference fringes overlap with the dark areas of the other group of interference fringes.

Return to FIGS. 5A and 5B. A signal processor 80 calculates the average (a first interference fringe for calculation) of the plurality of interference fringes created by the light beams that passed through the first polarizer 62. Likewise, the signal processor 80 calculates the average (a second interference fringe for calculation) of the plurality of interference fringes created by the light beams that passed through the second polarizer 64. The signal processor 80 then calculates the difference between these two averages and applies a Fourier transform to the data that represents this difference.

More specifically, the intensity distribution $I_1$ of the interference fringes created by the light beams that passed through the first polarizer 62 can be given by formula (1) below.

<#1>

$$I_1 = \int_0^\infty I(\sigma)(1+\cos 2\pi\sigma\Delta)d\sigma \qquad (1)$$

Here, $I(\sigma)$ is the intensity distribution of the light from a light source 10, where $\sigma$ is wavenumber, and $\Delta$ is the optical path difference between the ordinary light ray eo component and the extraordinary light ray oe component. Meanwhile, the phase difference between the ordinary light ray eo component and the extraordinary light ray oe component of the light beams that passed through the second polarizer 64 is shifted by exactly $\pi$ from the phase difference between the ordinary light ray eo component and the extraordinary light ray oe component of the light beams that passed through the first polarizer 62. Therefore, the intensity distribution $I_2$ of the interference fringes created by the light beams that passed through the second polarizer 64 can be given by formula (2) below.

<#2>

$$I_2 = \int_0^\infty I(\sigma)(1-\cos 2\pi\sigma\Delta)d\sigma \qquad (2)$$

As described above, the signal processor 80 then calculates the difference between the intensity distribution $I_1$ and the intensity distribution $I_2$. This difference is given by formula (3) below.

<#3>

$$I_1 - I_2 = 2\int_0^\infty I(\sigma)\cos 2\pi\sigma\Delta d\sigma \qquad (3)$$

As shown in formula (3), taking the difference between the intensity distribution $I_1$ and the intensity distribution $I_2$ makes it possible to remove the background noise (the first term in formulas (1) and (2)) in the intensity distributions and multiply the signal component (the second term in formulas (1) and (2)) that depends on the optical path difference $\Delta$ by 2.

Furthermore, the signal processor 80 does not need to calculate the abovementioned average on the basis of all of the interference fringes created by the light beams that passed through the first polarizer 62 (that is, all of the interference fringes in the region 72 in the example illustrated in FIG. 6) and may just calculate the abovementioned average on the basis of at least two of the interference fringes created by the light beams that passed through the first polarizer 62. Similarly, the signal processor 80 does not need to calculate the abovementioned average on the basis of all of the interference fringes created by the light beams that passed through the second polarizer 64 (that is, all of the interference fringes in the region 74 in the example illustrated in FIG. 6) and may just calculate the abovementioned average on the basis of at least two of the interference fringes created by the light beams that passed through the second polarizer 64.

Furthermore, the signal processor 80 may not calculate the abovementioned average for the interference fringes created by the light beams that passed through the first polarizer 62. Similarly, the signal processor 80 may not calculate the abovementioned average for the interference fringes created by the light beams that passed through the second polarizer 64. In this case, the signal processor 80 simply calculates the difference between one of the interference fringes created by the light beams that passed through the first polarizer 62 (a first interference fringe for calculation) and one of the interference fringes created by the light beams that passed through the second polarizer 64 (a second interference fringe for calculation), for example.

Moreover, the signal processor 80 may calculate the difference between the average of the interference fringes created by the light beams that passed through the first polarizer 62 (a first interference fringe for calculation) and one of the interference fringes created by the light beams that passed through the second polarizer 64 (a second interference fringe for calculation), for example. Similarly, the signal processor 80 may calculate the difference between one of the interference fringes created by the light beams that passed through the first polarizer 62 (a first interference fringe for calculation) and the average of the interference fringes created by the light beams that passed through the second polarizer 64 (a second interference fringe for calculation), for example.

As described above, in the present embodiment, some of the light beams from the fly's-eye lens 50 pass through the first polarizer 62, and the rest of the light beams from the fly's-eye lens 50 pass through the second polarizer 64. The signal processor 80 then calculates the difference between the interference fringes created by the light beams that passed through the first polarizer 62 and the interference fringes created by the light beams that passed through the second polarizer 64. Therefore, even when background noise present in the interference fringes detected by the detector 70, that background noise can be removed.

Furthermore, the present embodiment makes it possible to detect the interference fringes created by the light beams that passed through the first polarizer 62 and the interference fringes created by the light beams that passed through the second polarizer 64 at the same time. In other words, it is not necessary to detect the interference fringes created by the light beams that passed through the first polarizer 62 and the interference fringes created by the light beams that passed through the second polarizer 64 at different times. Therefore, the abovementioned difference can still be calculated even if time-dependent changes occur in the interference fringes detected by the detector 70.

Figure 7A:
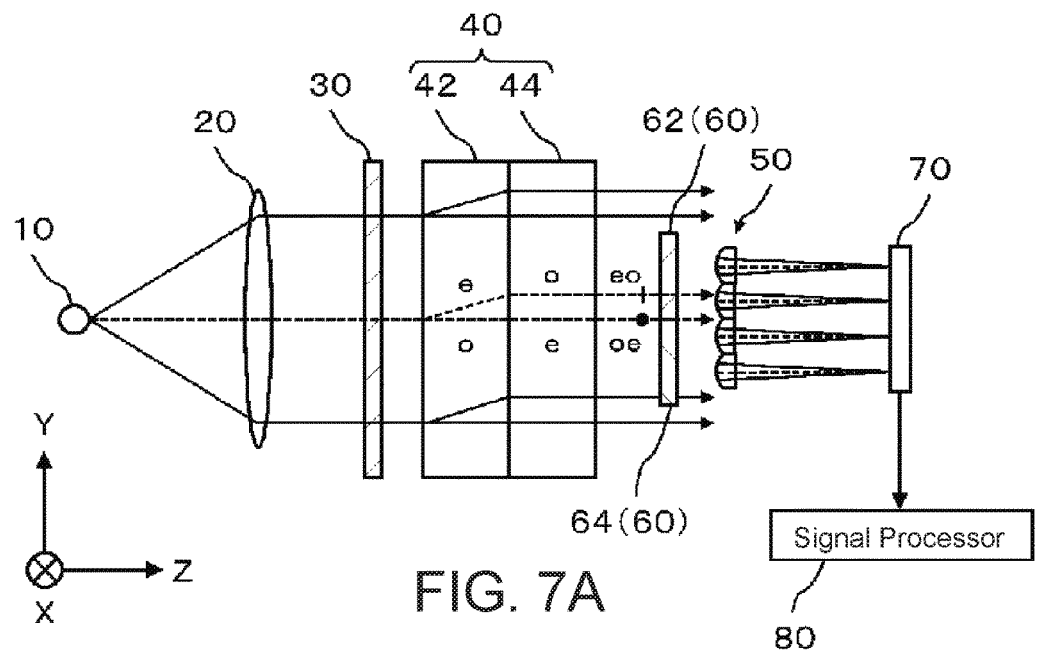
FIGS. 7A and 7B illustrate Modification Example 1 of FIGS. 5A and 5B.
Figure 7B:
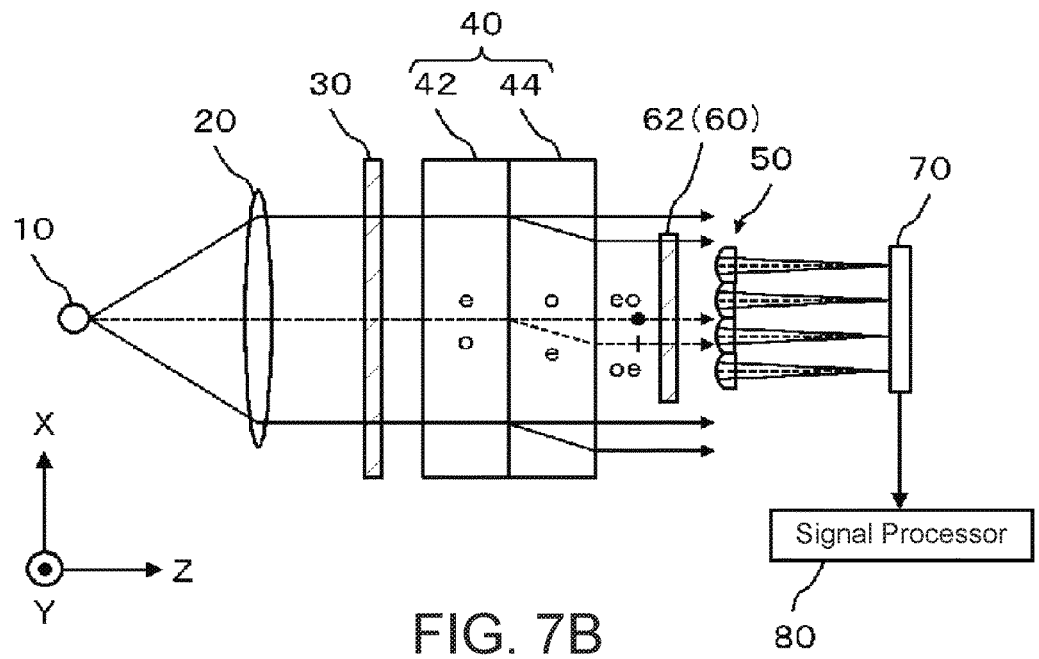

FIGS. 7A and 7B illustrate Modification Example 1 of FIGS. 5A and 5B. FIG. 7A is a side view of the spectrometer, and FIG. 7B is a top view of the spectrometer. As illustrated in FIGS. 7A and 7B, the first polarizer 62 and the second polarizer 64 may be arranged between the beam splitter 40 and the fly's-eye lens 50. In the example illustrated in FIGS. 7A and 7B, the first polarizer 62 and the second polarizer 64 are aligned with one another in the direction going from the beam splitter 40 towards the fly's-eye lens 50 (the Z direction in the figure). The light rays that pass through the first polarizer 62 enter the plurality of first lenses of the fly's-eye lens 50. The light rays that pass through the second polarizer 64 enter the plurality of second lenses of the fly's-eye lens 50.

Figure 8A:
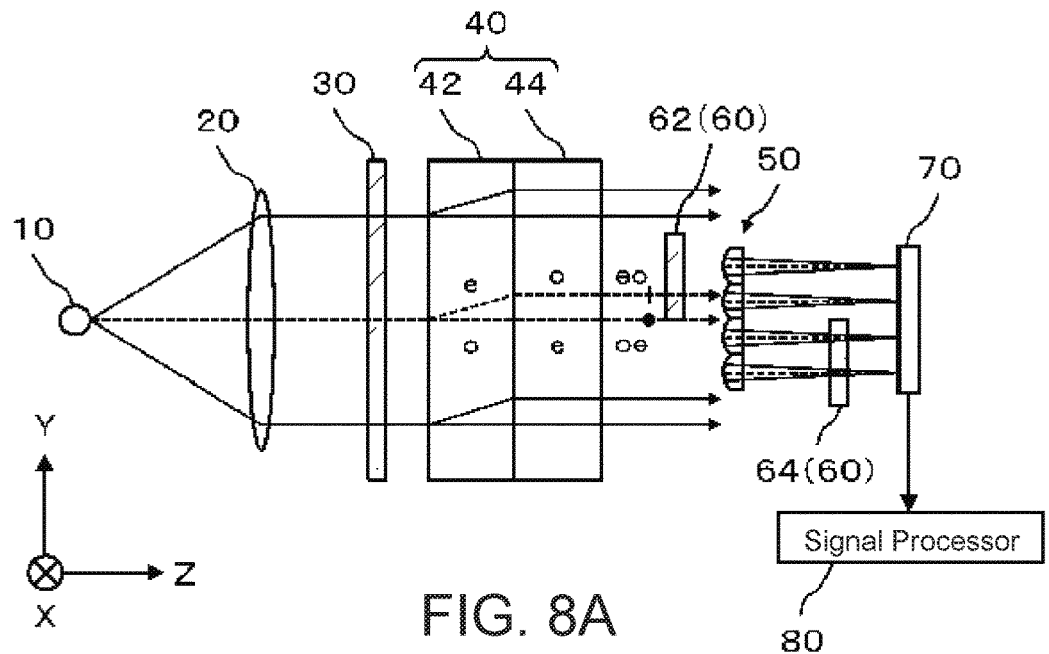
FIGS. 8A and 8B illustrate Modification Example 2 of FIGS. 5A and 5B.
Figure 8B:
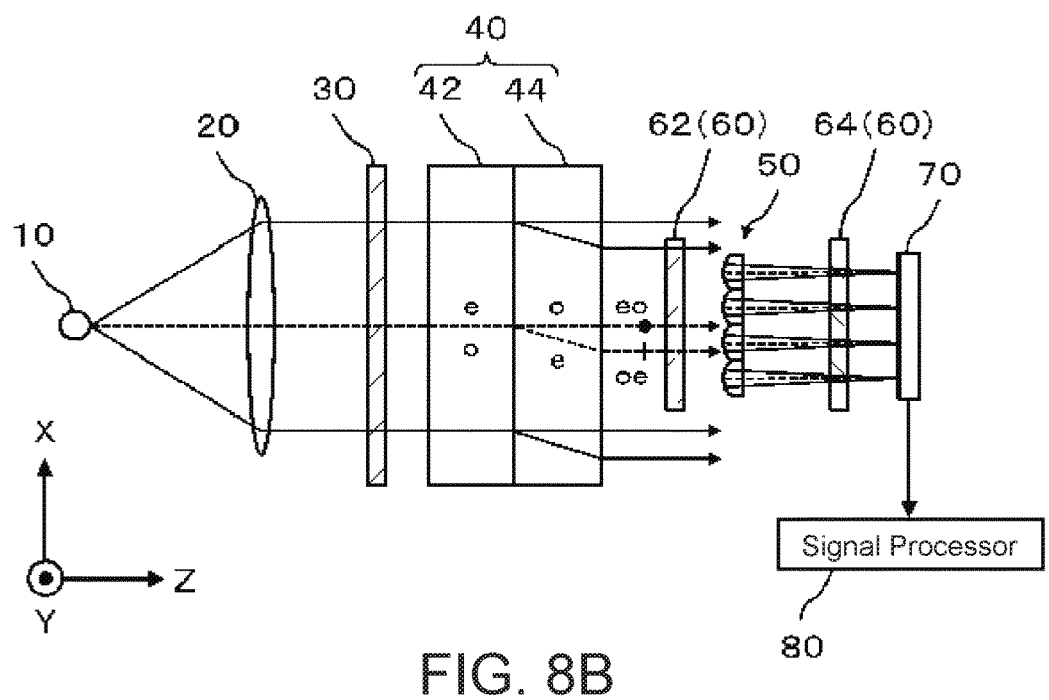

FIGS. 8A and 8B illustrate Modification Example 2 of FIGS. 5A and 5B. FIG. 8A is a side view of the spectrometer, and FIG. 8B is a top view of the spectrometer. As illustrated in FIGS. 8A and 8B, the first polarizer 62 is arranged between the beam splitter 40 and the fly's-eye lens 50, and the second polarizer 64 is arranged between the fly's-eye lens 50 and the detector 70. The light rays that pass through the first polarizer 62 enter the plurality of first lenses of the fly's-eye lens 50. The light beams that enter the second polarizer 64 are the light beams that exit from the second lenses of the fly's-eye lens 50.

Embodiment 3

Figure 9A:
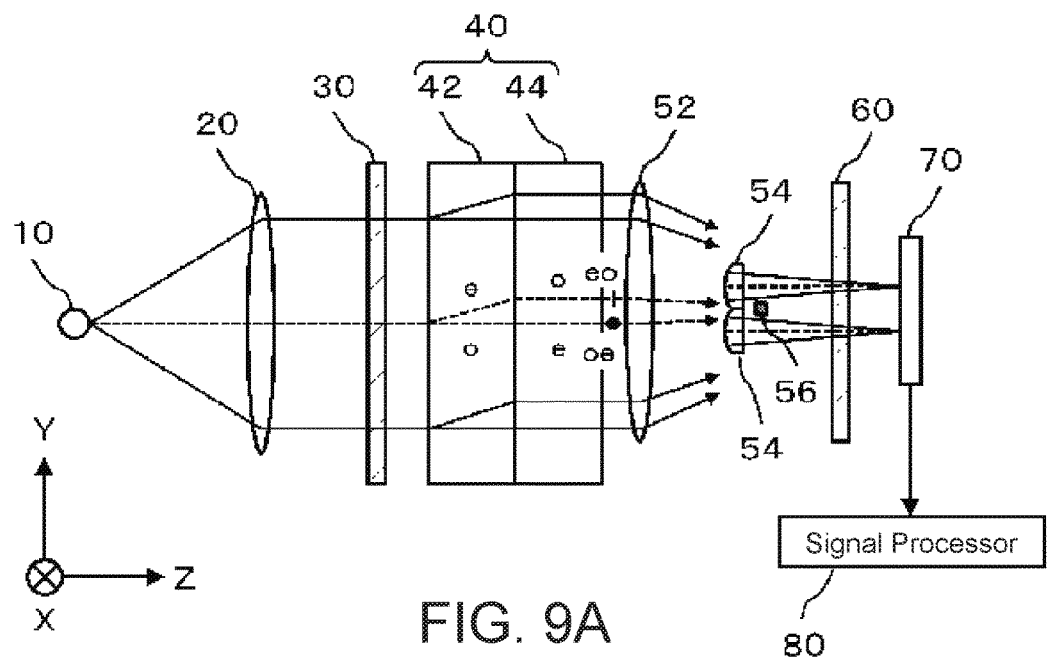
FIG. 9A is a side view illustrating a configuration of a spectrometer according to Embodiment 3.
Figure 9B:
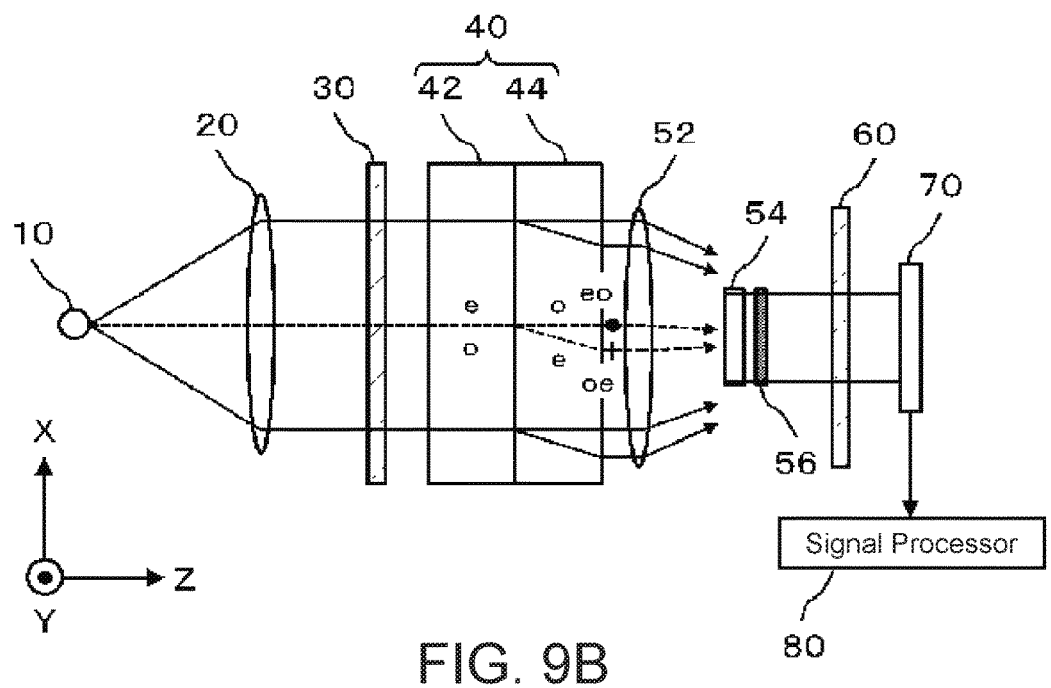
FIG. 9B is a top view illustrating the configuration of the spectrometer according to Embodiment 3.

FIG. 9A is a side view illustrating a configuration of a spectrometer according to Embodiment 3 and corresponds to FIG. 1A in Embodiment 1. FIG. 9B is a top view illustrating the configuration of the spectrometer according to the present embodiment and corresponds to FIG. 1B in Embodiment 1. The spectrometer according to the present embodiment has the same configuration as the spectrometer according to Embodiment 1 except for the following points.

In the example illustrated in FIGS. 9A and 9B, the fly's-eye lens 50 illustrated in FIGS. 1A and 1B is replaced by a lens 52 (a first lens) and a plurality of cylindrical lenses 54 (second lenses). In other words, in the example illustrated in FIGS. 9A and 9B, the optical member (the fly's-eye lens 50 in the example illustrated in FIGS. 1A and 1B) includes the lens 52 and the plurality of cylindrical lenses 54. The lens 52 is a biconvex Fourier transform lens that makes it possible to focus light rays into a single point. The cylindrical lenses 54 make it possible to focus light beams into straight lines.

The light rays that exit from a beam splitter 40 pass through the lens 52 and then pass through the plurality of cylindrical lenses 54. All of the components of the light rays that exit from the beam splitter 40 enter the lens 52. In the example illustrated in FIGS. 9A and 9B, two of the cylindrical lenses 54 are arranged in the height direction of the spectrometer (the Y direction in the figure). Each of the cylindrical lenses 54 has a first surface that faces the lens 52 and a second surface on the side opposite to the first surface. When viewed from the width direction of the spectrometer (the X direction in the figure), the first surface of each cylindrical lens 54 is a curved surface, and the second surface of each cylindrical lens 54 is a flat surface. The two cylindrical lenses 54 are arranged such that the second surface of the one of the cylindrical lenses 54 and the second surface of the other of the cylindrical lenses 54 are aligned with one another.

When viewed from the direction running parallel to the optical axis of the light (an ordinary light ray eo and an extraordinary light ray oe) that enters the plurality of cylindrical lenses 54 (the Z direction in the figure), each of the cylindrical lenses 54 is positioned within the spot of the ordinary light ray eo and the spot of the extraordinary light ray oe. Therefore, the ordinary light ray eo and the extraordinary light ray oe enter all of the cylindrical lenses 54.

The cylindrical lenses 54 focus the light beams from the beam splitter 40 into straight lines. In the example illustrated in FIGS. 9A and 9B, each of the cylindrical lenses 54 focuses the light beams into a straight line that extends in the width direction of the spectrometer (the X direction in the figure). In this way, the light rays from the beam splitter 40 are split into a plurality of light beams by the cylindrical lenses 54. Moreover, in the example illustrated in FIGS. 9A and 9B, a light shield 56 is arranged between the plurality of split light beams. In this way, even if a portion of the light beams that passed through the cylindrical lenses 54 stray off path, the light shield 56 blocks that stray light. This makes it possible to prevent stray light from reaching a detector 70.

The plurality of light beams split by the cylindrical lenses 54 pass through a polarizer 60 and then arrive at the detector 70. Each of the light beams split by the cylindrical lenses 54 includes an ordinary light ray eo component and an extraordinary light ray oe component. Therefore, like in the example illustrated in FIGS. 1A and 1B, a plurality of interference fringes are created. The detector 70 detects this plurality of interference fringes.

Like in the example illustrated in FIGS. 1A and 1B, a signal processor 80 calculates the average of the plurality of interference fringes on the basis of the detection results from the detector 70. The signal processor 80 then applies a Fourier transform to the data that represents that average.

Figure 10:
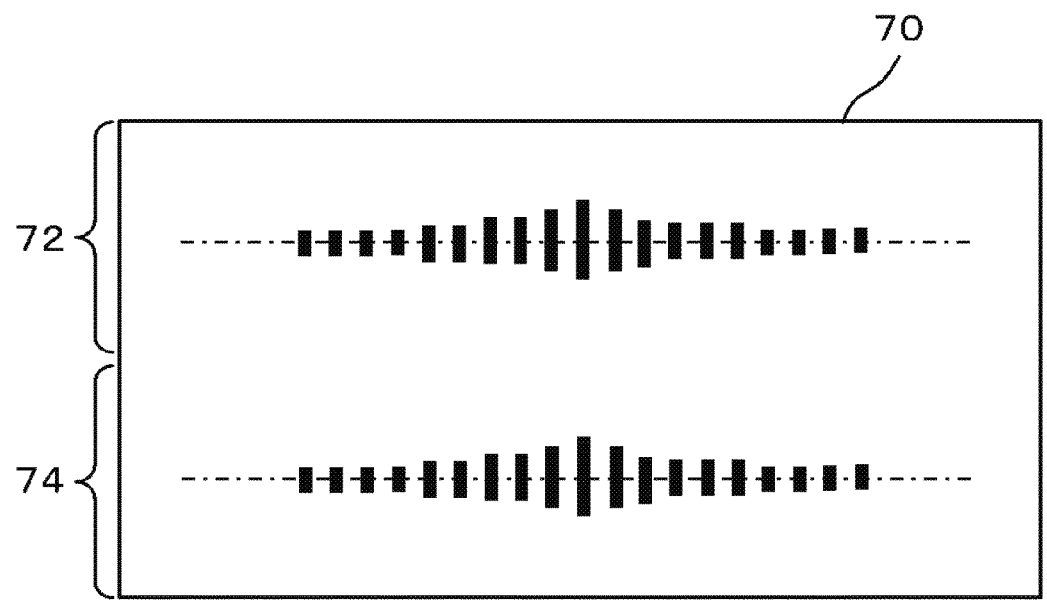
FIG. 10 illustrates an example of a plurality of interference fringes created by the spectrometer illustrated in FIGS. 9A and 9B.
Figure 10:
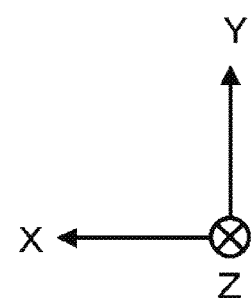

FIG. 10 illustrates an example of the plurality of interference fringes created by the spectrometer illustrated in FIGS. 9A and 9B and corresponds to FIG. 3 in Embodiment 1. In the example illustrated in FIG. 10, the plurality of interference fringes are shown as viewed from the front side of the detector 70. As described with reference to FIGS. 9A and 9B, the plurality of cylindrical lenses 54 are arranged in the height direction of the spectrometer (the Y direction in the figure). As a result, the plurality of interference fringes are also arranged in the height direction of the spectrometer (the Y direction in the figure). In the example illustrated in FIG. 10, the interference fringe in a region 72 is the interference fringe (a first interference fringe) created by the light beams that passed through the upper cylindrical lens 54. Meanwhile, the interference fringe in a region 74 is the interference fringe (a second interference fringe) created by the light beams that passed through the lower cylindrical lens 54. As described with reference to FIGS. 9A and 9B, each of the cylindrical lenses 54 focuses the light beams into a straight line that extends in the width direction of the spectrometer (the X direction in the figure). As a result, each interference fringe also extends in the width direction of the spectrometer (the X direction in the figure).

Figure 11A:
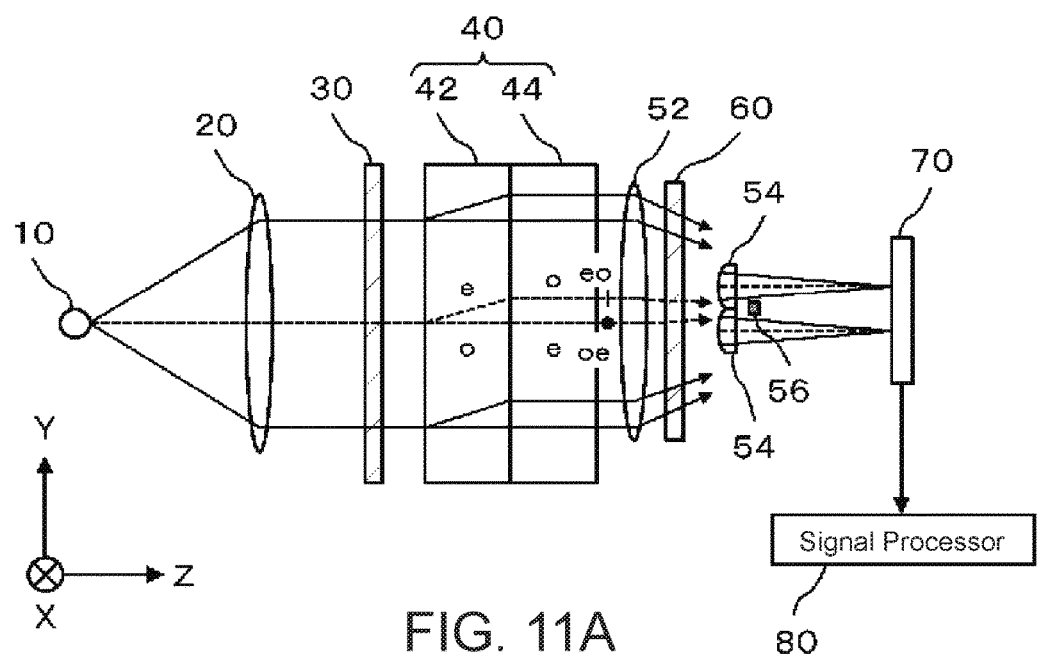
FIGS. 11A and 11B illustrate a modification example of FIGS. 9A and 9B.
Figure 11B:
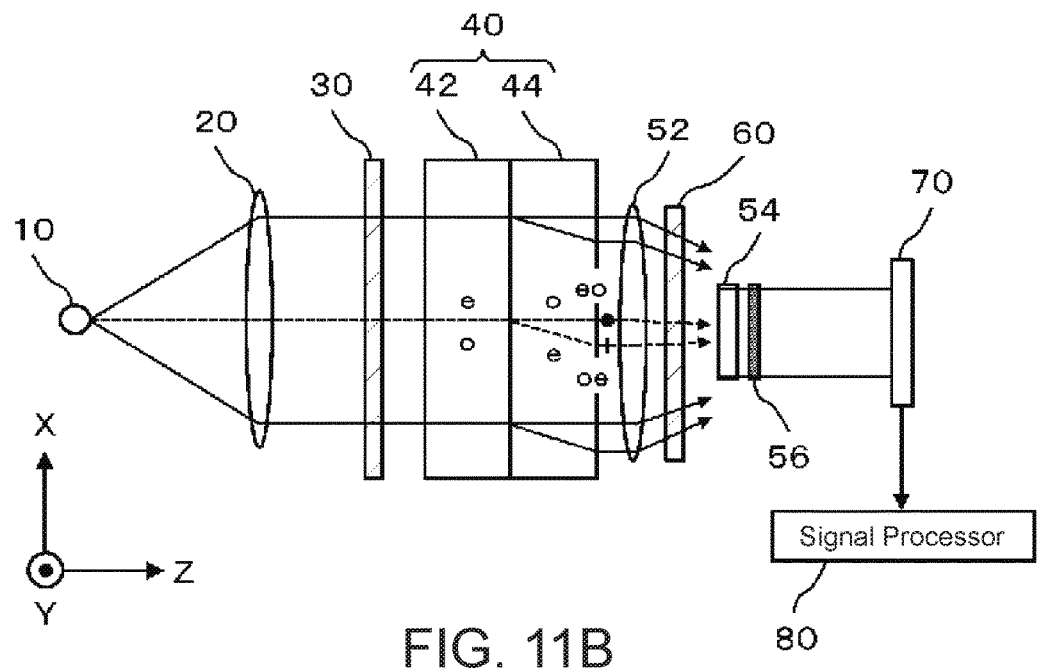

FIGS. 11A and 11B illustrate a modification example of FIGS. 9A and 9B and correspond to FIGS. 4A and 4B in Embodiment 1. FIG. 11A is a side view of the spectrometer, and FIG. 11B is a top view of the spectrometer. As illustrated in FIGS. 11A and 11B, the light rays from the beam splitter 40 may pass through the polarizer 60 before being split into a plurality of light beams by the plurality of cylindrical lenses 54. More specifically, in the example illustrated in FIGS. 11A and 11B, the polarizer 60 is arranged between the lens 52 and the plurality of cylindrical lenses 54.

Embodiment 4

Figure 12A:
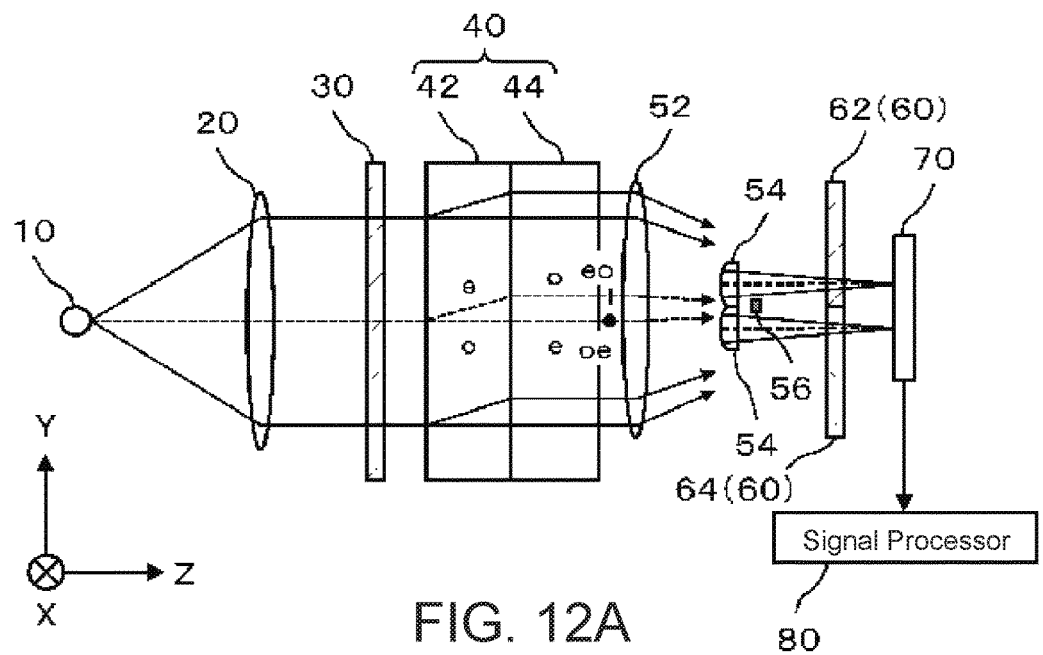
FIG. 12A is a side view illustrating a configuration of a spectrometer according to Embodiment 4.
Figure 12B:
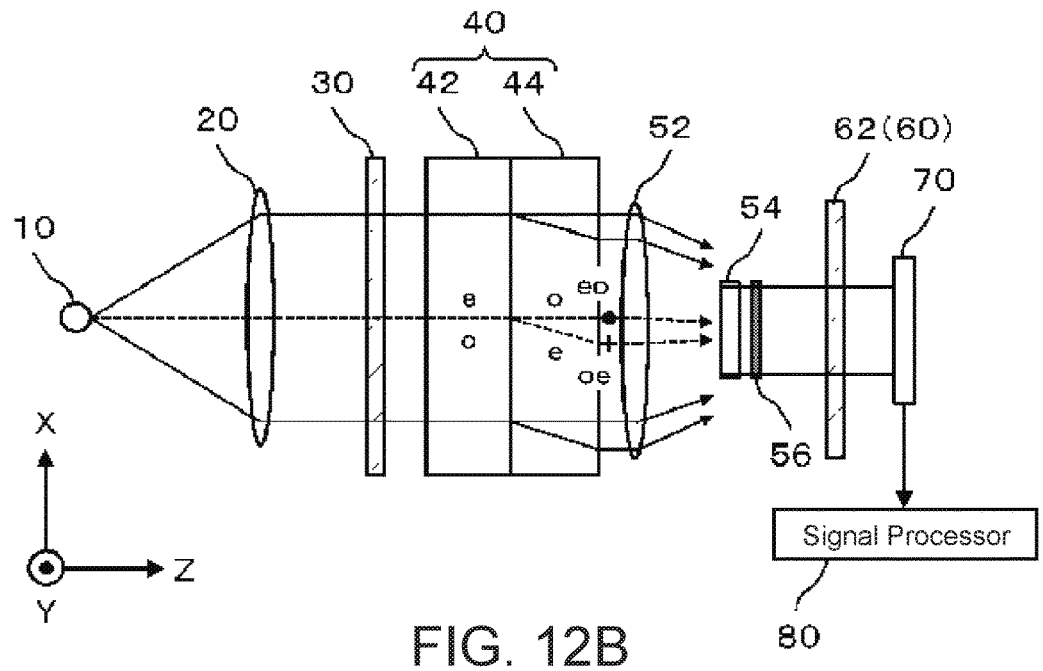
FIG. 12B is a top view illustrating the configuration of the spectrometer according to Embodiment 4.

FIG. 12A is a side view illustrating a configuration of a spectrometer according to Embodiment 4 and corresponds to FIG. 5A in Embodiment 2 and FIG. 9A in Embodiment 3. FIG. 12B is a top view illustrating the configuration of the spectrometer according to the present embodiment and corresponds to FIG. 5B in Embodiment 2 and FIG. 9B in Embodiment 3. The spectrometer according to the present embodiment has the same configuration as the spectrometer according to Embodiment 2 and the spectrometer according to Embodiment 3 except for the following points.

Like in the example illustrated in FIGS. 5A and 5B, in the example illustrated in FIGS. 12A and 12B, a first polarizer 62 and a second polarizer 64 are arranged between a plurality of cylindrical lenses 54 and a detector 70. Furthermore, in the example illustrated in FIGS. 12A and 12B, the first polarizer 62 and the second polarizer 64 are aligned with one another in the direction going from the plurality of cylindrical lenses 54 towards the detector 70 (the Z direction in the figure). The transmission axis of the first polarizer 62 and the transmission axis of the second polarizer 64 are oriented in different directions. More specifically, the transmission axes of the first polarizer 62 and the second polarizer 64 are mutually orthogonal when viewed from the direction running parallel to the optical axis of the light that passes through first polarizer 62 and the second polarizer 64 (the Z direction in the figure). Even more specifically, the transmission axis of the first polarizer 62 is inclined by an angle of 45° towards one of the sides going from the height direction of the spectrometer (the Y direction in the figure) towards the width direction of the spectrometer (the X direction in the figure), and the transmission axis of the second polarizer 64 is inclined by an angle of 45° towards the other of the sides going from the height direction of the spectrometer (the Y direction in the figure) towards the width direction of the spectrometer (the X direction in the figure).

The light beams that exit from one of the two cylindrical lenses 54 enter the first polarizer 62. The light beams that exit from the other of the two cylindrical lenses 54 enter the second polarizer 64.

The detector 70 detects an interference fringe (a first interference fringe) created by the light beams that passed through the first polarizer 62 and an interference fringe (a second interference fringe) created by the light beams that passed through the second polarizer 64.

A signal processor 80 calculates the difference between the first interference fringe and the second interference fringe. The signal processor 80 then applies a Fourier transform to the data that represents that difference. Here, as described above with reference to formula (3), taking the difference between the intensity distribution $I_1$ of the first interference fringe and the intensity distribution $I_2$ of the second interference fringe makes it possible to remove the background noise (the first term in formulas (1) and (2)) in the intensity distributions and multiply the signal component (the second term in formulas (1) and (2)) that depends on the optical path difference Δ by 2.

Figure 13:
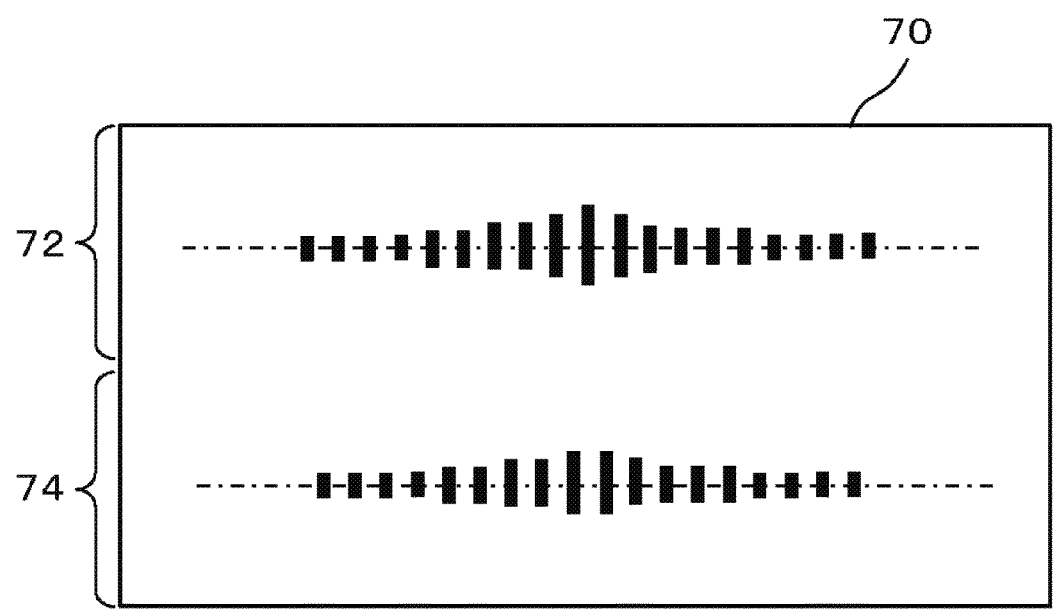
FIG. 13 illustrates an example of a plurality of interference fringes created by the spectrometer illustrated in FIGS. 12A and 12B.
Figure 13:
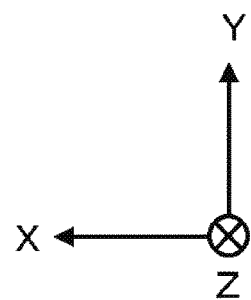

FIG. 13 illustrates an example of the plurality of interference fringes created by the spectrometer illustrated in FIGS. 12A and 12B and corresponds to FIG. 10 in Embodiment 3. In the example illustrated in FIG. 13, the plurality of interference fringes are shown as viewed from the front side of the detector 70. As described with reference to FIGS. 12A and 12B, the plurality of cylindrical lenses 54 are arranged in the height direction of the spectrometer (the Y direction in the figure). As a result, the plurality of interference fringes are also arranged in the height direction of the spectrometer (the Y direction in the figure). In the example illustrated in FIG. 13, the interference fringe in a region 72 is the interference fringe (a first interference fringe) created by the light beams that passed through the first polarizer 62. Meanwhile, the interference fringe in a region 74 is the interference fringe (a second interference fringe) created by the light beams that passed through the second polarizer 64. Moreover, as illustrated in FIG. 13, when the interference fringe in the region 72 and the interference fringe in the region 74 are overlaid on top of one another, the bright areas of one interference fringe overlap with the dark areas of the other interference fringe.

Figure 14A:
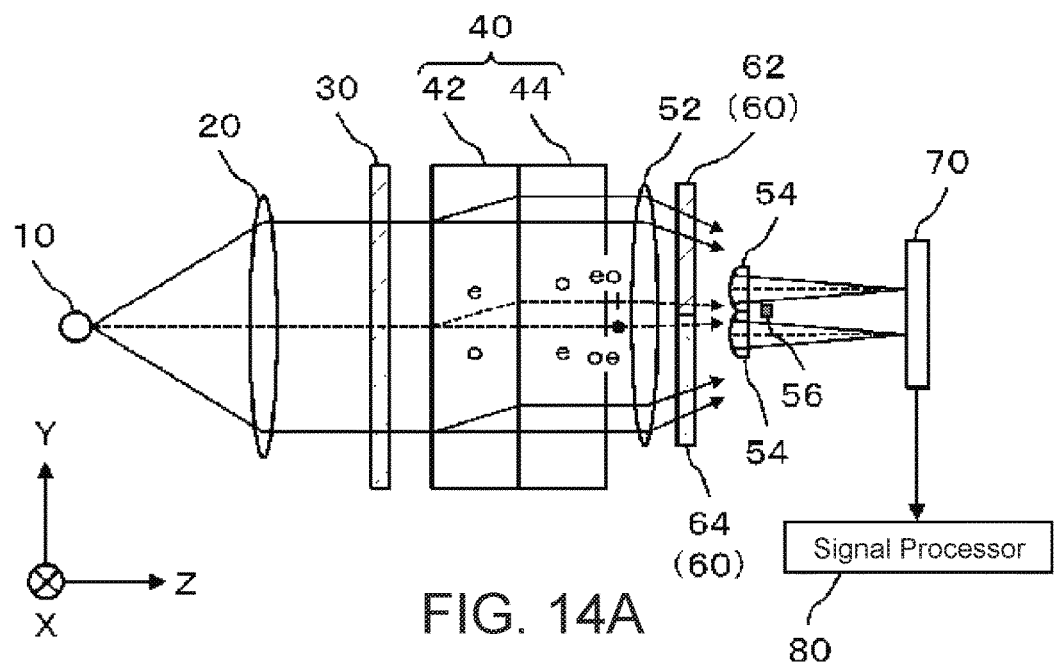
FIGS. 14A and 14B illustrate Modification Example 1 of FIGS. 12A and 12B.
Figure 14B:
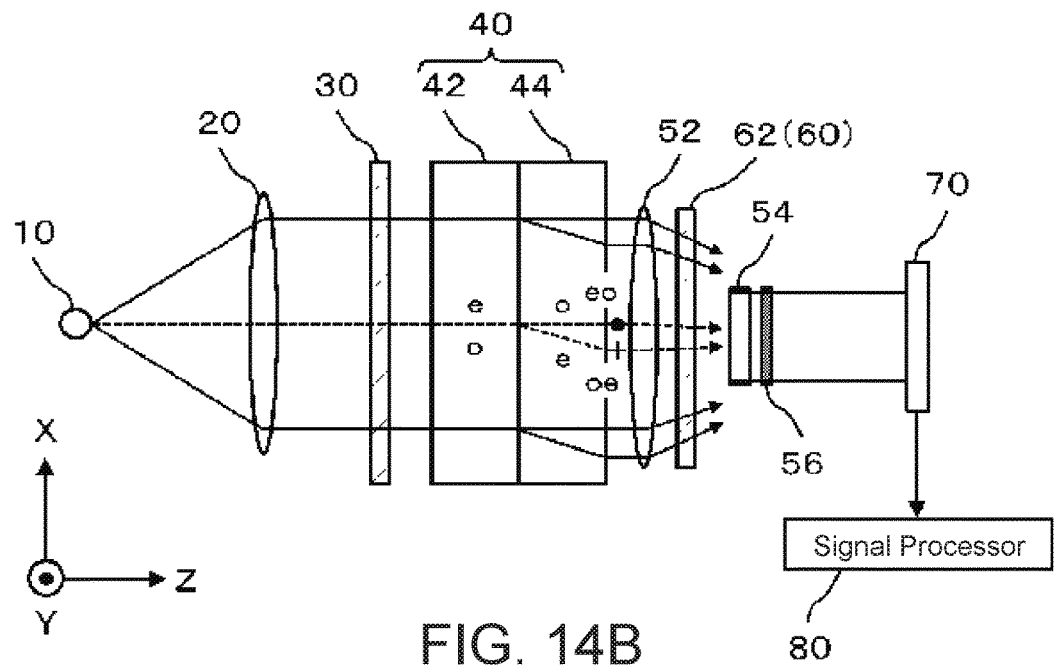

FIGS. 14A and 14B illustrate Modification Example 1 of FIGS. 12A and 12B and correspond to FIGS. 7A and 7B in Embodiment 2. FIG. 14A is a side view of the spectrometer, and FIG. 14B is a top view of the spectrometer. As illustrated in FIGS. 14A and 14B, the light rays from the beam splitter 40 may pass through the first polarizer 62 and the second polarizer 64 before being split into a plurality of light beams by the plurality of cylindrical lenses 54. More specifically, in the example illustrated in FIGS. 14A and 14B, the first polarizer 62 and the second polarizer 64 are arranged between the lens 52 and the plurality of cylindrical lenses 54. Furthermore, the first polarizer 62 and the second polarizer 64 are aligned with one another in the direction going from the beam splitter 40 towards the plurality of cylindrical lenses 54 (the Z direction in the figure).

Figure 15A:
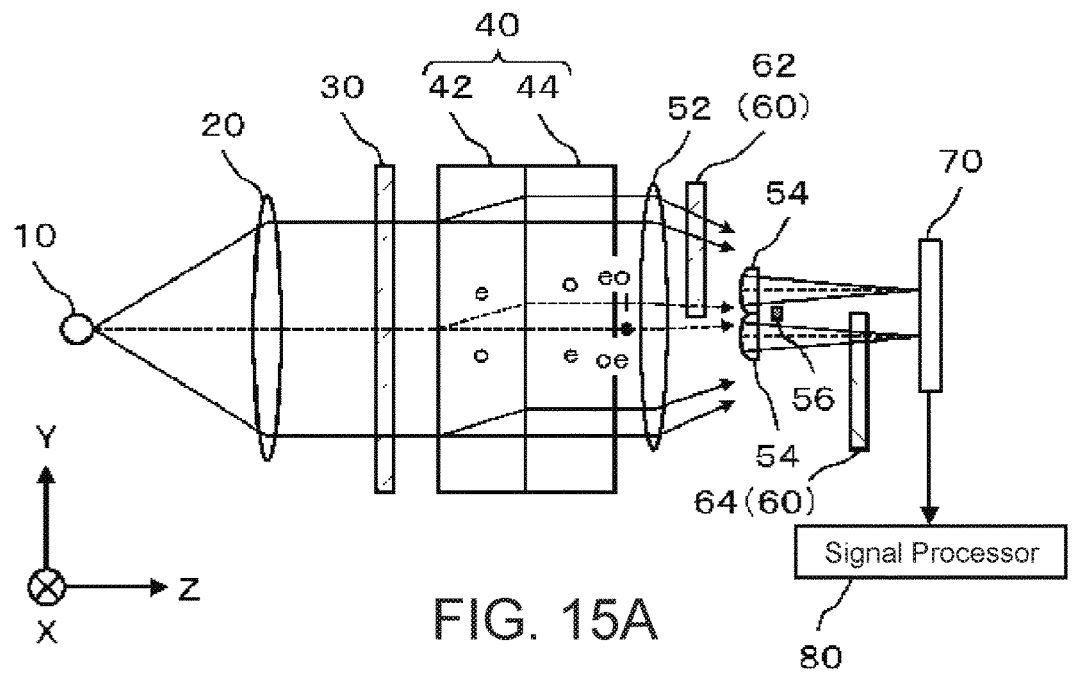
Figure 15B:
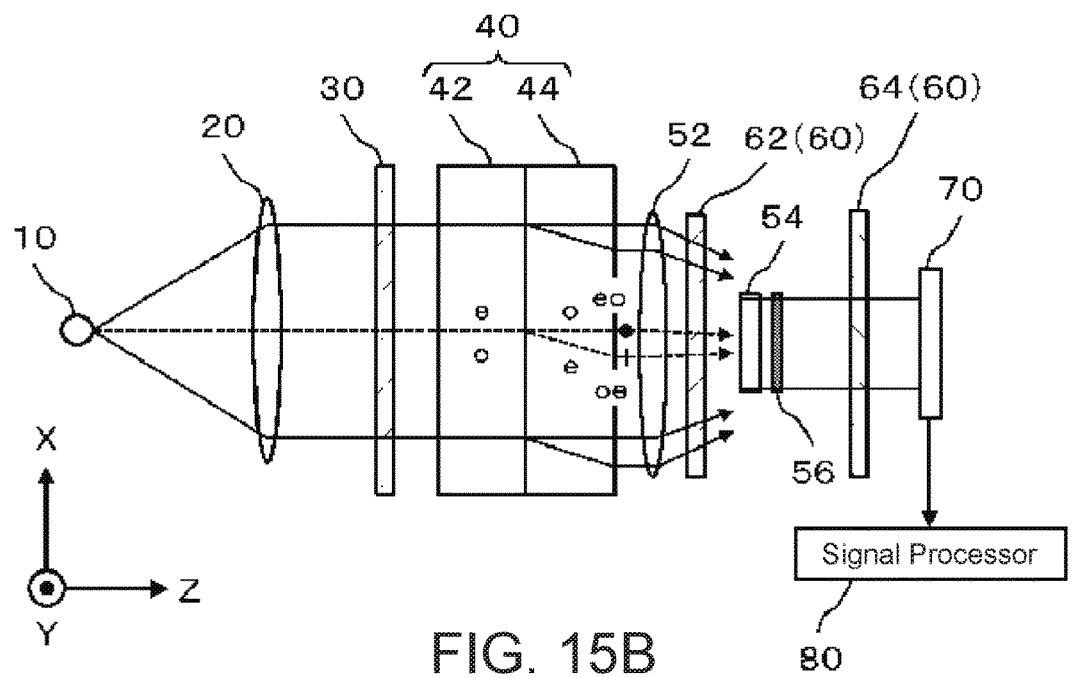
FIG. 15B is a top view of the spectrometer.

FIGS. 15A and 15B illustrate Modification Example 2 of FIGS. 12A and 12B and correspond to FIGS. 8A and 8B in Embodiment 2. FIG. 15A is a side view of the spectrometer, and FIG. 15B is a top view of the spectrometer. In the example illustrated in FIGS. 15A and 15B, some of the light rays from the beam splitter 40 pass through the first polarizer 62 before the light rays from the beam splitter 40 are split by the plurality of cylindrical lenses 54, and the rest of the light rays from the beam splitter 40 pass through the second polarizer 64 after the light rays from the beam splitter 40 are split by plurality of cylindrical lenses 54. The first polarizer 62 is positioned between the lens 52 and the plurality of cylindrical lenses 54, and the second polarizer 64 is positioned between the plurality of cylindrical lenses 54 and the detector 70.

Embodiments of the present invention were described above with reference to figures. However, these embodiments are only examples of the present invention, and various configurations other than those described above can be used.

What is claimed is:

1. A spectrometer, comprising:
   a beam splitter that receives a single uniform flux of incident light rays and splits each of the incident light rays into first and second spatially displaced, linearly polarized light rays that respectively have first and second polarization directions orthogonal to each other, the beam splitter outputting a single uniform flux of said split incident light rays;
   an optical member that receives said single uniform flux of said split incident light rays from the beam splitter and optically divides said single uniform flux of said split incident light rays into a plurality of light beams that are respectively guided to mutually differing locations so as to generate interference fringes in the respective locations, each of the plurality of light beams including a component of the first linearly polarized light rays and a component of the second linearly polarized light rays; and
   a detector that detects the interference fringes respectively generated by the plurality of light beams.

2. The spectrometer according to claim 1,
   wherein the optical member is a plurality of lenses each having a focal point, and
   wherein the plurality of light beams respectively exit from mutually differing lenses of the plurality of lenses.

3. The spectrometer according to claim 1,
   wherein the optical member includes:
   a first lens having a single focal point, receiving said split incident light rays, and
   a plurality of second lenses respectively having mutually different focal straight lines, the plurality of second lenses receiving light transmitting from the first lens so as to generate said plurality of light beams respectively from mutually different second lenses of the plurality of second lenses.

4. The spectrometer according to claim 1, further comprising:
a signal processor that calculates an average of at least two of the interference fringes and then applies a Fourier transform to data representing the average.

5. The spectrometer according to claim 1, further comprising:
a first polarizer; and
a second polarizer having a transmission axis in a direction different from a transmission axis of the first polarizer,
wherein the first polarizer is disposed such that a portion of light rays traveling from the beam splitter towards the detector passes through the first polarizer either before the split incident light rays from the beam splitter are optically converted into the plurality of light beams or after the split incident light rays from the beam splitter are optically converted into the plurality of light beams, and
wherein the second polarizer is disposed such that another portion of the light rays traveling from the beam splitter towards the detector passes through the second polarizer either before the split incident light rays from the beam splitter are optically converted into the plurality of light beams or after the split incident light rays from the beam splitter are optically converted into the plurality of light beams.

6. The spectrometer according to claim 5,
wherein the detector detects a first interference fringe or fringes, which are said interference fringes created by light rays that pass through the first polarizer,
wherein the detector detects a second interference fringe or fringes, which are said interference fringes created by light rays that pass through the second polarizer, and
wherein the spectrometer further comprises a signal processor that calculates a difference between said first interference fringe and said second interference fringe or calculates a difference between a first averaged fringe obtained by taking an average of the first interference fringes and a second averaged fringe obtained by taking an average of the second interference fringes, said signal processor then applying a Fourier transform to data representing the difference.

7. The spectrometer according to claim 5, wherein the first polarizer and the second polarizer are aligned with one another with respect to a position in a direction directed from the beam splitter towards the detector.

8. A method of spectroscopy, comprising:
receiving a single uniform flux of incident light rays and splitting each of the incident light rays into first and second spatially displaced, linearly polarized light rays that respectively have first and second polarization directions orthogonal to each other, thereby outputting a single uniform flux of said split incident light rays using a beam splitter;
by an optical member, receiving said single uniform flux of said split incident light rays from the beam splitter and optically dividing said single uniform flux of said split incident light rays into a plurality of light beams that are respectively guided to mutually differing locations so as to generate interference fringes in the respective locations, each of the plurality of light beams including a component of the first linearly polarized light rays and a component of the second linearly polarized light rays; and
detecting the interference fringes respectively generated by the plurality of light beams using a detector.

9. A spectrometer, comprising:
a beam splitter that receives a single uniform flux of incident light rays and splits each of the incident light rays into first and second spatially displaced, linearly polarized light rays that respectively have first and second polarization directions orthogonal to each other, the beam splitter outputting a single uniform flux of said split incident light rays;
an optical member that receives said single uniform flux of said split incident light rays from the beam splitter and optically divides said single uniform flux of said split incident light rays into a plurality of light beams that are respectively guided to mutually differing locations on a virtual plane so as to generate interference fringes in the respective locations in the virtual plane, each of the plurality of light beams including a component of the first linearly polarized light rays and a component of the second linearly polarized light rays;
a two-dimensional detector that detects the interference fringes respectively generated by the plurality of light beams on the virtual plane; and
a signal processor that applies a Fourier transform to data representing the interference fringes detected by the detector or applies a Fourier transform to data obtained by processing the data representing the interference fringes detected by the detector.

10. The spectrometer according to claim 9, further comprising:
a first polarizer; and
a second polarizer having a transmission axis in a direction different from a transmission axis of the first polarizer,
wherein the first polarizer is disposed such that a portion of light rays traveling from the beam splitter towards the detector passes through the first polarizer either before the split incident light rays from the beam splitter are optically converted into the plurality of light beams or after the split incident light rays from the beam splitter are optically converted into the plurality of light beams,
wherein the second polarizer is disposed such that another portion of the light rays traveling from the beam splitter towards the detector passes through the second polarizer either before the split incident light rays from the beam splitter are optically converted into the plurality of light beams or after the split incident light rays from the beam splitter are optically converted into the plurality of light beams, and
wherein the signal processor calculates a difference between a first interference fringe originated by light rays that have passed through the first polarizer and a second interference fringe originated by light rays that have passed through the second polarizer, said signal processor then applying a Fourier transform to data representing the difference.

11. The spectrometer according to claim 10,
wherein the first polarizer is disposed such that said portion of light rays traveling from the beam splitter towards the detector passes through the first polarizer before the split incident light rays from the beam splitter are optically converted into the plurality of light beams, and
wherein the second polarizer is disposed such that said another portion of the light rays traveling from the beam splitter towards the detector passes through the second polarizer after the split incident light rays from the beam splitter are optically converted into the plurality of light beams.

\* \* \* \* \*